(12) United States Patent
Driscoll et al.

(10) Patent No.: US 7,323,206 B1
(45) Date of Patent: Jan. 29, 2008

(54) REAGENTS AND METHODS FOR ALL-IN-ONE TOTAL PARENTERAL NUTRITION FOR NEONATES AND INFANTS

(75) Inventors: David Driscoll, Bridgewater, MA (US); Bruce Bistrian, Upswich, MA (US)

(73) Assignee: B. Braun Medical Inc., Bethlehem, PA (US)

( * ) Notice: Subject to any disclaimer, the term of this patent is extended or adjusted under 35 U.S.C. 154(b) by 0 days.

(21) Appl. No.: 10/795,200

(22) Filed: Mar. 4, 2004

Related U.S. Application Data

(60) Provisional application No. 60/451,968, filed on Mar. 4, 2003.

(51) Int. Cl.
A23D 7/00 (2006.01)
A23D 9/00 (2006.01)
(52) U.S. Cl. ..................... 426/602; 426/801
(58) Field of Classification Search ........... 514/23, 514/560, 49; 426/602, 801
See application file for complete search history.

(56) References Cited

U.S. PATENT DOCUMENTS

| | | | |
|---|---|---|---|
| 4,857,555 A | 8/1989 | Smith et al. | |
| 5,039,704 A | 8/1991 | Smith et al. | |
| 5,053,387 A | 10/1991 | Alexander | |
| 5,196,198 A * | 3/1993 | Shaw et al. | 514/549 |
| 5,206,220 A * | 4/1993 | Hilton | 514/19 |
| 5,231,085 A | 7/1993 | Alexander et al. | |
| 5,248,697 A | 9/1993 | Wilmore | |
| 5,276,018 A | 1/1994 | Wilmore | |
| 5,288,703 A | 2/1994 | Wilmore | |
| 5,292,722 A | 3/1994 | Wilmore | |
| 5,397,803 A | 3/1995 | Smith et al. | |
| 5,461,037 A | 10/1995 | Cotter | |
| 5,574,065 A | 11/1996 | Trimbo | |
| 5,576,351 A | 11/1996 | Yoshimura et al. | |
| 5,607,975 A | 3/1997 | Smith et al. | |
| 5,684,045 A | 11/1997 | Smith et al. | |
| 5,700,837 A | 12/1997 | Trimbo | |
| 5,731,346 A | 3/1998 | Egberg et al. | |
| 5,733,884 A | 3/1998 | Barbul et al. | |
| 5,747,533 A | 5/1998 | Egberg et al. | |
| 5,760,020 A | 6/1998 | Cotter | |
| 5,760,157 A | 6/1998 | Cerf et al. | |
| 5,763,485 A | 6/1998 | Smith et al. | |
| 5,766,621 A | 6/1998 | Trimbo et al. | |
| 5,843,465 A | 12/1998 | Lundquist | |
| 5,874,470 A | 2/1999 | Nehne et al. | |
| 5,886,037 A | 3/1999 | Klor et al. | |
| 5,977,175 A | 11/1999 | Lin | |
| 6,008,248 A * | 12/1999 | Pscherer et al. | 514/560 |
| 6,036,992 A * | 3/2000 | Borror et al. | 426/662 |
| 6,077,828 A | 6/2000 | Abbruzzese et al. | |
| 6,096,338 A | 8/2000 | Lacy et al. | |
| 6,200,950 B1 | 3/2001 | Mark et al. | |
| 6,267,985 B1 | 7/2001 | Chen et al. | |
| 6,284,268 B1 | 9/2001 | Mishra et al. | |
| 6,306,908 B1 | 10/2001 | Carlson et al. | |
| 6,313,167 B1 | 11/2001 | Nakajima et al. | |
| 6,355,609 B1 | 3/2002 | Mallangi et al. | |
| 6,552,081 B1 | 4/2003 | Freedman et al. | |
| 6,720,001 B2 | 4/2004 | Chen et al. | |
| 6,761,903 B2 | 7/2004 | Chen et al. | |

FOREIGN PATENT DOCUMENTS

WO  WO9719683  6/1997

OTHER PUBLICATIONS

Driscoll et al., "Physicochemical stability assessments of lipid emulsions of varying oil composition," Clinical Nutrition (2001) vol. 20(2); pp. 151-157.*
Sato et al. "Hyrolysis of Mixed Lipid Emulsions Containing Medium-Chain and Long-Chain Triacylglycerol With Lipoprotein Lipase in Plasma-like Medium," Journal of Parenteral and Enteral Nutrition, 1994, vol. 18, No. 2, pp. 112-118.*
Heird, et al., Annual Review of Nutrition, 1996, 16:471-99.*
Kraus, http://www.uic.edu/classes/pmpr/pmpr652/Final/krauss/pedsnutrition.html; Spring 1998.*
Glahn, et al., J. Nutrition, 1998, pp. 257-264.*
Heine, et al., J. Nutrition, 1991, pp. 277-283.*
Abbott et al., "Metabolic and Respiratory Effects of Continuous and Discontinuous Lipid Infusions," Arch. Surg., Dec. 1984, vol. 119, pp. 1367-1371.
Avila-Figueroa et al., "Intravenous Lipid Emulsions Are The Major Determinant of Coagulase-Negative *Staphylococcal bacteremia* In Very Low Birth Weight Newborns," Pediatr. Infect. Dis. J., 1998, vol. 17, No. 1, pp. 10-17.
Bach et al., "Medium-Chain Triglycerides: An Update," The American Journal of Clinical Nutrition, 36, Nov. 1982, pp. 950-962.
Bennett et al., "Postoperative Infections Traced to Contamination Of An Intravenous Anesthetic Propofol," Jul. 20, 1995, vol. 333, No. 3, pp. 147-154.
D'Angio et al., "Effect of the Mode of Lipid Administration of Parenteral Nutrition-Related Infections," The Annals of Pharmacotherapy, Jan. 1992, vol. 26, pp. 14-17.
Deckelbaum et al., "Medium-Chain Versus Long-Chain Triacylglycerol Emulsion Hydrolysis by Lipoprotein Lipase and Hepatic Lipase: Implications for the Mechanisms of Lipase Action," Biochemistry, 1990, 29, pp. 1136-1142.
Didier et al., "Total Nutrient Admixtures Appear Safer Than Lipid Emulsion Alone As Regards Microbial Contamination: Growth Properties of Microbial Pathogens at Room Temperature," Journal of Parenteral and Enteral Nutrition, Sep./Oct. 1998, vol. 22, No. 5, pp. 291-296.

(Continued)

*Primary Examiner*—Mark L. Berch
*Assistant Examiner*—Cecilia M Jaisle
(74) *Attorney, Agent, or Firm*—Christie, Parker & Hale LLP

(57) ABSTRACT

Materials and methods for preparing and using All-in-One ("AIO") formulations suitable for administration to infants and neonates for total parenteral nutrition are provided.

38 Claims, 7 Drawing Sheets
(2 of 7 Drawing Sheet(s) Filed in Color)

OTHER PUBLICATIONS

Driscoll et al., "Physicochemical Assessments of Parenteral Lipid Emulsions: Light Obscuration Versus Laser Diffraction," International Journal of Pharmaceutics, 219, 2001, pp. 21-37.

Driscoll et al., "Physicochemical Stability Assessments of Lipid Emulsions of Varying Oil Composition," Clincial Nutrition, 2001, 20(2), pp. 151-157.

Driscoll et al., "Physicochemical Stability of Intravenous Lipid Emulsions As All-In-One Admixtures Intended for the Very Young," Clinical Nutrition, 2003. 22(5), pp. 489-495.

Driscoll et al., "Physicochemical Stability of Total Nutrient Admixtures," Am. J. Health-Syst. Pharm., vol. 52, Mar. 15, 1995, pp. 623-624.

Driscoll et al., "Physicochemical Stability of Two Types of Intravenous Lipid Emulsion As Total Nutrient Admixtures," Journal of Parenteral and Enteral Nutrition, Jan.-Feb. 2000, vol. 24, No. 1, pp. 15-22.

Driscoll et al., "The Influence of Medium-Chain Triglycerides on the Stability of All-In-One Formulations," International Journal of Pharmaceutics, 240, 2002, pp. 1-10.

Driscoll, David, "Clinical Issues Regarding the Use of Total Nutrient Admixtures," DICP, The Annals of Pharmacotherapy, vol. 24, Mar. 1990, pp. 296-303.

Driscoll, David, "Physicochemical Assessment of Total Nutrient Admixure Stability and Safety: Quantifying the Risk," Nutrition, vol. 13, No. 2, 1997, pp. 166-167.

Driscoll, David, "The Significance of Particle/Globule-Sizing Measurements In the Safe Use of Intravenous Lipid Emulsions," Journal of Dispersion Science and Technology, vol. 23, No. 5, 2002, pp. 679-687.

Driscoll, David, "Total Nutrient Admixtures: Theory and Practice," Nutrition In Clinical Practice, vol. 10, No. 3, Jun. 1995, pp. 114-119.

El-Ebiary et al., "Lipid Deposition During the Long-Term Infusion of Propofol," Critical Care Medicine, vol. 23, No. 11, Nov. 1995, pp. 1928-1930.

Freeman et al., "Association of Intravenous Lipid Emulsion and Coagulase-Negative *Staphylococcal bacteremia* In Neonatal Intensive Care Units," The New England Journal of Medicine, Aug. 2, 1990, vol. 323, No. 5, pp. 301-308.

Hamberger et al., "More Efficient Clearance of Intravenous (I.V.) Lipid Emulsions Containing Medium Chain Triglyceride (MCT) And Fish Oil Triglycerides (Ω-3 TG) As Compared to Traditional Long Chain Triglyceride (LCT) Lipid Emulsions In In Vitro Models and Humans" Abstracts No. 2988, Apr. 1998.

Hamilton et al., "Incorporation of Medium Chain Triacylglycerols Into Phospholipid Bilayers: Effect of Long Chain Triacylglycerols, Cholesterol, and Cholesteryl Esters," Journal of Lipid Research, vol. 37, 1996, pp. 773-782.

Hulman, Geoffrey, "The Pathogenesis of Fat Embolism," Journal of Pathology, 1995, vol. 176, pp. 3-9.

Jarvis et al., Polymicrobial Bacteremia Associated with Lipid Emulsion In A Neonatal Intensive Care Unit, May 1983, vol. 2, No. 3, pp. 203-208.

Khaodhiar et al., "Perioperative Hyperglycemia, Infection or Risk?," vol. 2(1), Jan. 1999, pp. 79-82.

Kim et al., "Bacterial and Fungal Growth In Intravenous Fat Emulsions," Am. J. Hosp. Pharm., Dec. 1983, vol. 40, pp. 2159-2161.

Klein et al., "Metabolic Effects of Long-Chain and Medium-Chain Triglyceride Emulsions In Humans," Journal of Parenteral and Enteral Nutrition, Sep.-Oct. 1994, vol. 18, No. 5, pp. 396-397.

Matlow et al., "A Randomized Trial of 72-Versus 24-Hour Intravenous Tubing Set Changes in Newborns Receiving Lipid Therapy," Infection Control and Hospital Epidemiology, Jul. 1999, vol. 20, No. 7, pp. 487-493.

McKee et al., "Gram-Negative Bacillary Sepsis Associated With Use of Lipid Emulsion in Parenteral Nutrition," Am. J. Dis. Child, Jun. 1979, vol. 133, pp. 649-650.

Melly et al., "Microbial Growth in Lipid Emulsions Used in Parenteral Nutrition," Arch. Surg, Dec. 1975, vol. 110, pp. 1479-1481.

Moore, Frederick, "Caution: Use Fat Emulsions Judiciously in Intensive Care Patients," Crit. Care Med., 2001, vol. 29, No. 8, pp. 1644-1645.

Reiter, Pamela., "Sterility of Intravenous Fat Emulsion in Plastic Syringes," Am. J. Health-Syst. Pharm., Oct. 1, 2002, vol. 59, pp. 1857-1859.

Rowe et al., "Growth of Microorganisms in Total Nutrient Admixtures," Drug Intelligence and Clinical Pharmacy, Jul./Aug. 1987, vol. 21, pp. 633-638.

Sacks et al., "Does Lipid Hang Time Make a Difference? Time Is of the Essence," Nutrition in Clinical Practice, vol. 17, No. 5, Oct. 2002, pp. 284-290.

Sato et al., "Hydrolysis of Mixed Lipid Emulsions Containing Medium-Chain and Long-Chain Triacylglycerol With Lipoprotein Lipase In Plasma-Like Medium," Journal of Parenteral and Enteral Nutrition, vol. 18, No. 2, Mar.-Apr. 1994, pp. 112-118.

Smyrniotis et al., "Long-Chain Versus Medium-Chain Lipids In Acute Pancreatitis Complicated by Acute Respiratory Distress Syndrome: Effects On Pulmonary Hemodynamics and Gas Exchange," Clinical Nutrition, 2001, 20(2), pp. 139-143.

Vasilakis et al., "Answering the Fat Emulsion Contamination Question: Three In One Admixture vs. Conventional Total Parenteral Nutrition In A Clinical Setting," Journal of Parenteral and Enteral Nutrition, Jul./Aug. 1988, vol. 12, No. 4, pp. 356-359.

Washington et al., "Computational Prediction of the Stability of Lipid Emulsions In Total Nutrient Admixtures," Journal of Pharmaceutical Sciences, Aug. 1993, vol. 82, No. 8, pp. 808-812.

Washington et al., "The Electrokinetic Properties of Phosopholipid Stabilized Fat Emulsions. V. The Effect of Amino Acids on Emulsion Stability," International Journal of Pharmaceutics, 77, 1991, pp. 57-63.

Washington, C., "The Electrokinetic Properties of Phospholipid Stabilized Fat Emulsions, VI. Zeta Potentials of Intralipid 20% in TPN Mixtures," International Journal of Pharmaceutics, 87, 1992, pp. 167-174.

Driscoll; "Examination of Selection of Light-Scattering and Light-Obscuration Acceptance Criteria for Lipid Injectable Emulsions": Pharmacopeial Forum. vol. 30. No. 6, Nov.-Dec. 2004, pp. 2244-2253.

Bullock et al., "Emulsion Stability in Total Nutrient Admixtures Containing a Pediatric Amino Acid Formulation"; Journal of Parenteral and Enteral Nutrition. vol. 16, No. 1, Jan.-Feb. 1992, pp. 64-68.

* cited by examiner

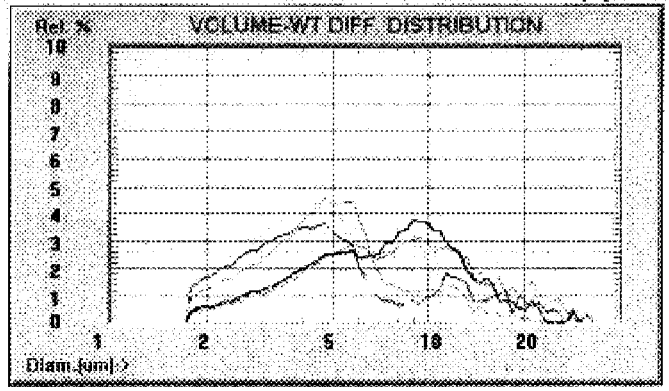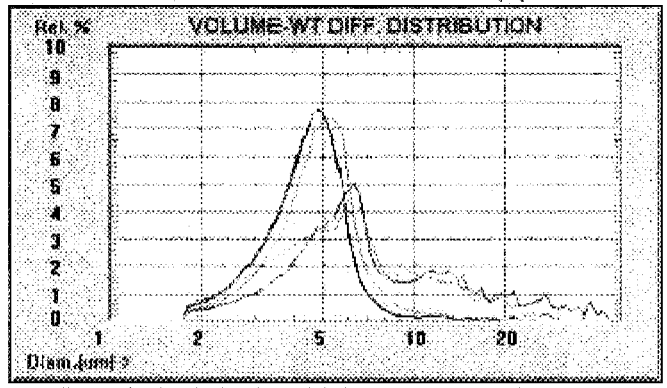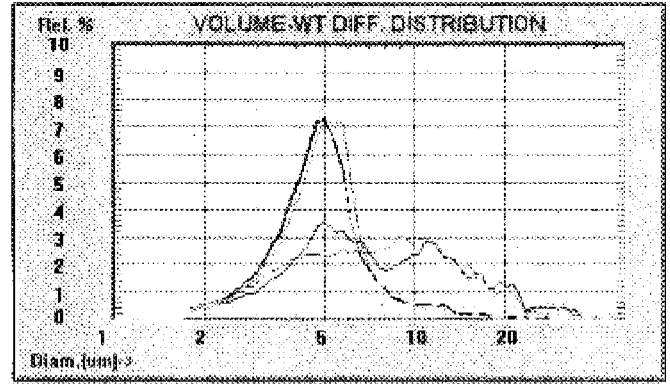
FIG. 1

Fig. 2. Photomicrographs of: (a) Admixture I at time 0 h;(b) Admixture I at time 30 h; (c) Admixture II at time 0 h; (d) Admixture II at time 30 h; (e) Admixture III at time 0 h; (f) Admixture III at time 30 h.

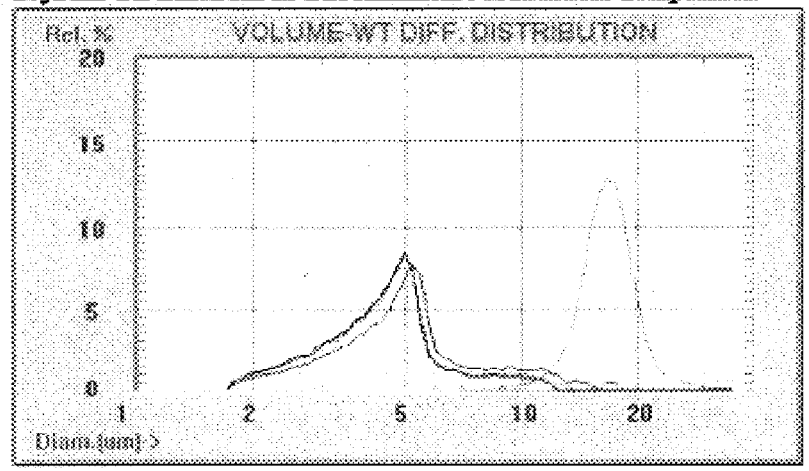
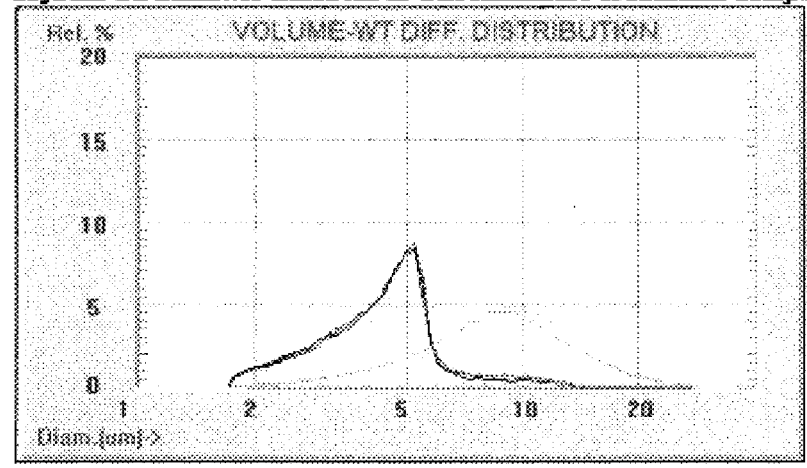
FIG. 3

FIG. 4  GRAPHIC DEPICTION OF ADMIXTURE II GSD PROFILES
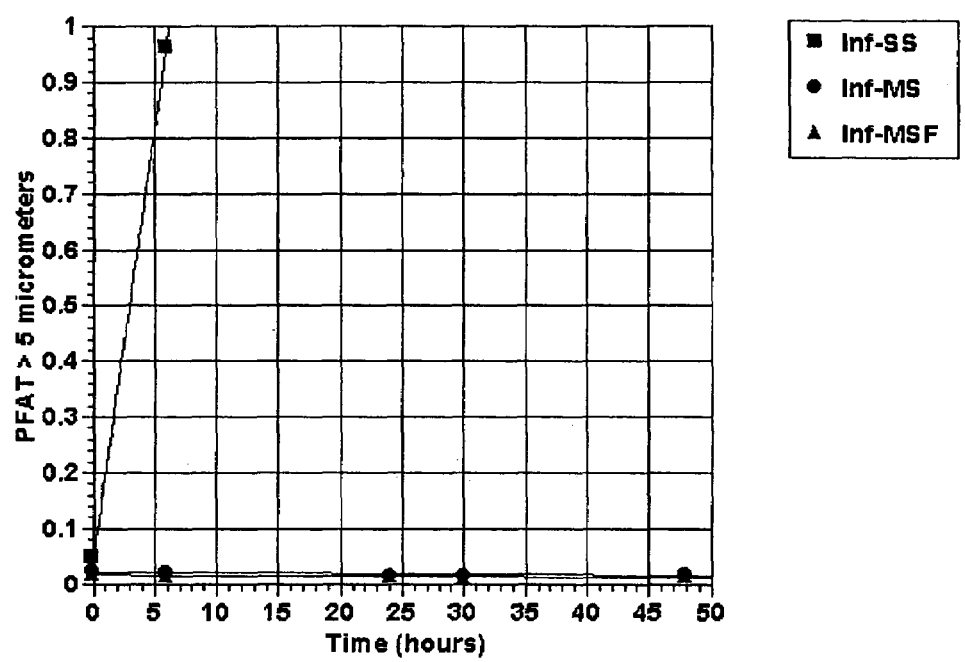

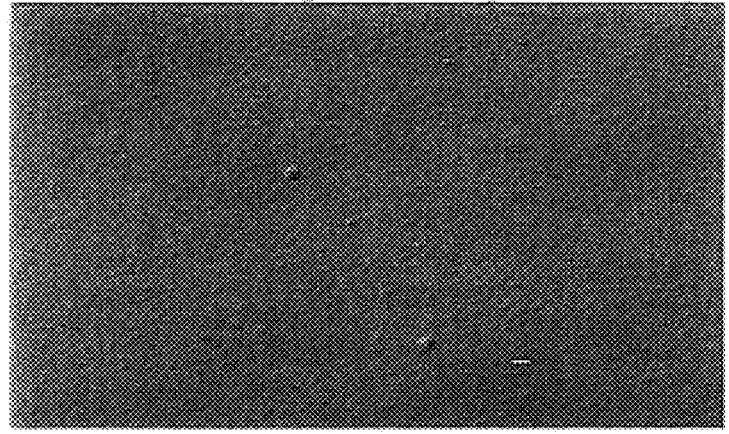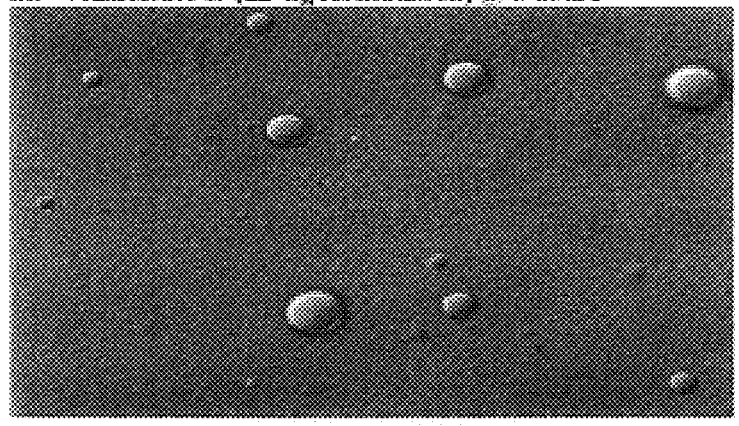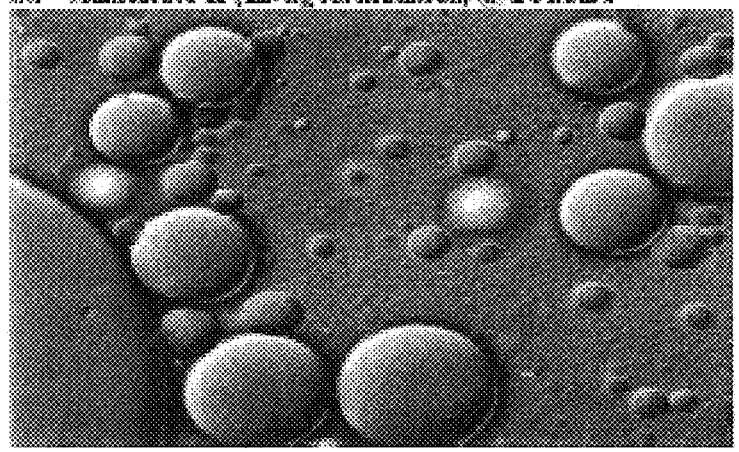
FIG. 5A

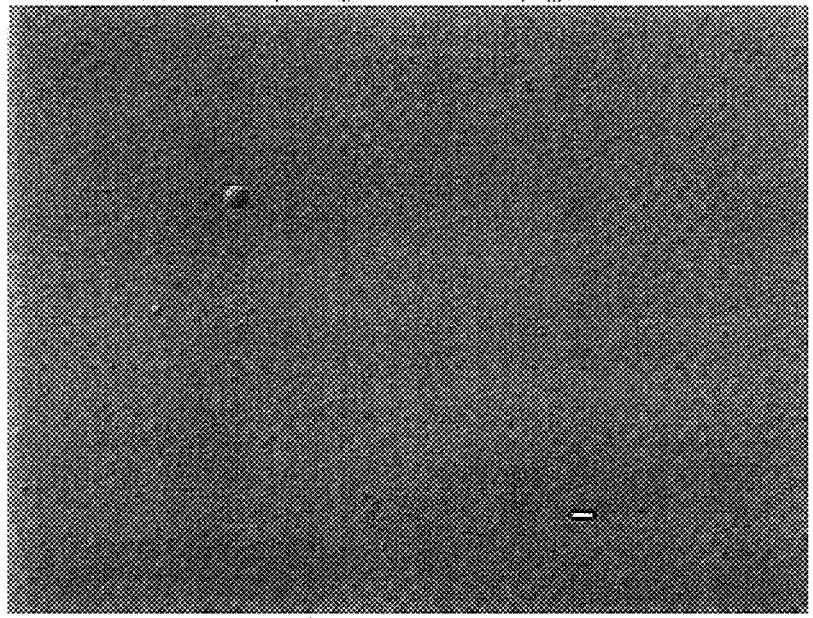
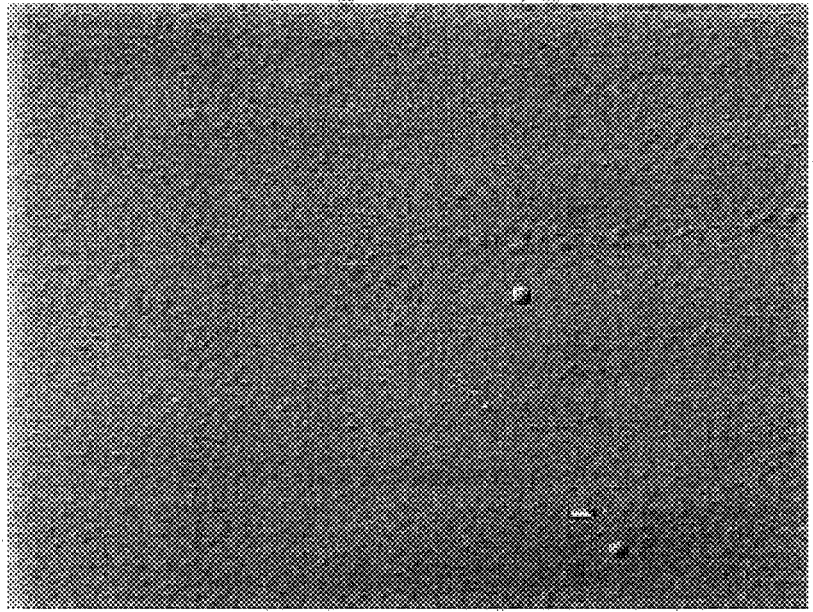
FIG. 5B

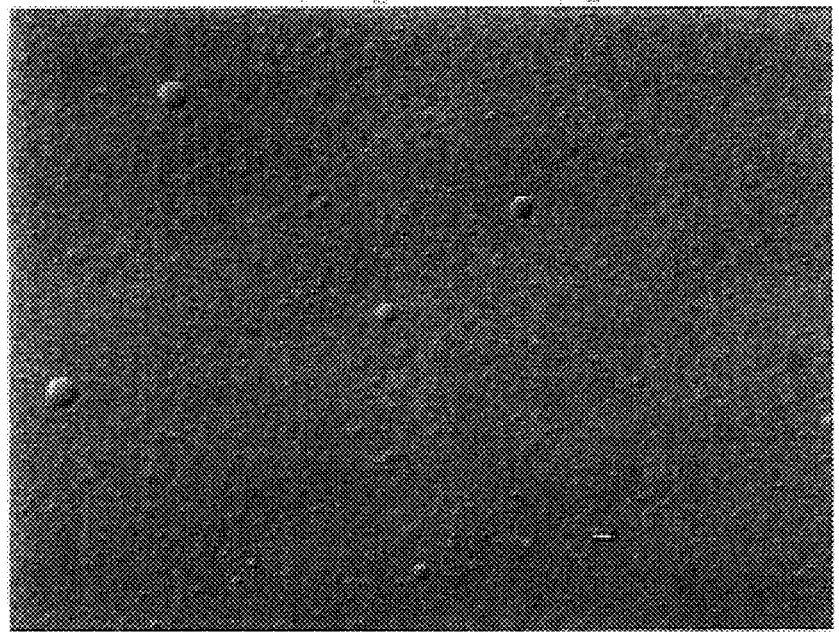
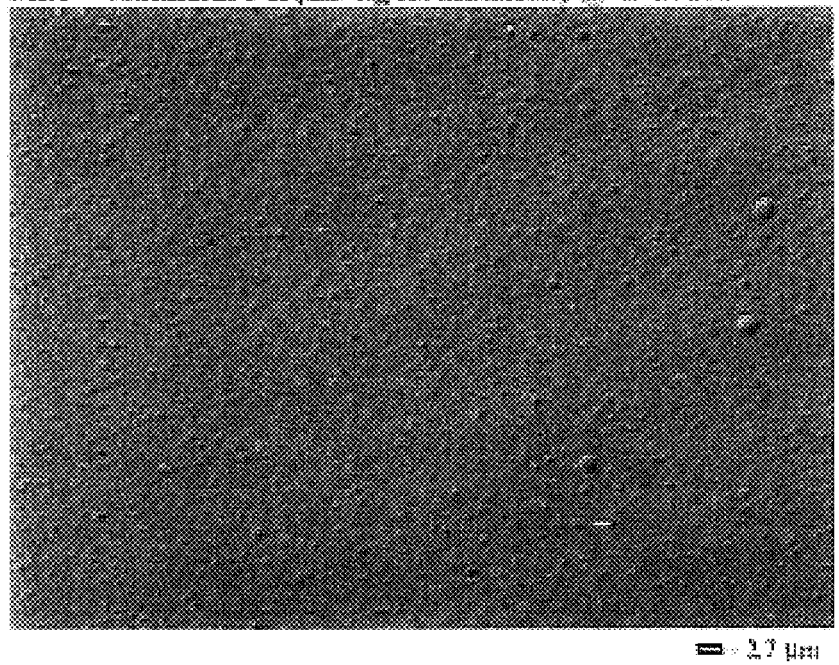
FIG. 5C

REAGENTS AND METHODS FOR ALL-IN-ONE TOTAL PARENTERAL NUTRITION FOR NEONATES AND INFANTS

CROSS-REFERENCE TO RELATED APPLICATION(S)

This application claims the benefit of U.S. Provisional Application Ser. No. 60/451,968, filed Mar. 4, 2003, the contents of which is hereby incorporated by reference in its entirety.

BACKGROUND OF THE INVENTION

Intravenous lipid emulsions (IVLEs) have been used in the clinical setting for over 40 years. By substitution of a portion of the calories derived from carbohydrate, IVLEs have significantly reduced the clinical complications associated with hypertonic glucose infusions as part of TPN therapy (Driscoll, D. F., 1990, DICP. Ann. Pharmacother. 24, 296-303.) In particular, hyperglycemia significantly increases the risk of infectious complications (Khaodhiar, L., McCowen, K., Bistrian, B. R., 1999, Curr. Opin. Clin. Nutr. Metab. Care 7, 79-82). Moreover, as long as the rate of lipid infusion from long-chain triglycerides (LCTs) does not exceed 0.11 g/kg/h, major toxicities such as immune dysfunction and pulmonary gas diffusion abnormalities are avoided (Klein, S., Miles, J. M., 1994, J. Parenter. Enteral Nutr. 18, 396-397).

Providing IVLEs continuously as an all-in-one admixture fosters a safe administration rate that minimizes infusion-related complications, yet can induce emulsion instability (Driscoll, D. F., Adolph, M., Bistrian, B. R., 2000, in: Rombeau, J. L., Rolandelli, R. H. (Eds.), Clinical Nutrition—Parenteral Nutrition. WB Saunders Company, Philadelphia, Pa., USA). Alternative lipid emulsion mixtures containing medium-chain triglycerides (MCTs) may reduce the toxicity associated with pure LCT-based lipid emulsions (Smyrniotis, V. E., et al., 2001, Clin. Nutr. 20, 139-143) and may also yield more stable all-in-one admixtures (Driscoll, D. F., Bacon, M. N., Bistrian, B. R., 2000, J. Parenter. Enteral Nutr. 24, 15-22). Nevertheless, it is the ultimate goal of the pharmacist to assign a beyond-use date to such compounded preparations that ensures the admixture does not progress to a state that produces clinically-evident adverse effects (Driscoll, D. F., 1995, Nutr. Clin. Pract. 10, 114-119).

The physicochemical stability of IVLEs is crucial to their safety, as the coalescence of colloidally stable submicron lipid droplets (<1 µm) forming oversized fat globules (>5 µm) in the large diameter tail of the particle size distribution may be trapped in the pulmonary microcirculation (Globule Size Distribution in Intravenous Emulsions, 1998, Proposed (Chapter 729), in-process revision, Pharmacopoeial Forum, vol. 24, pp. 6988-6994.). As the internal diameter of the pulmonary capillaries is between 4 and 9 µm, the intravenous infusion of unstable lipid emulsions may produce an embolic syndrome. Thus, any critical assessment of IVLE stability and safety must include this remote population of unstable fat globules for active signs of coalescence manifested by an expanding population of oversized fat globules in the large-diameter tail of the droplet size distribution. The usual volume-weighted percent of fat (PFAT) globules found in the large diameter tail (>5 µm) of commercially available IVLEs ranging in concentrations of 100-300 g/l (10, 20 and 30% w/v formulations), has been shown to be as low as 0.001% up to 0.05% (Driscoll, D. F., et al., 2001, Int. J. Pharm. 219, 21-37). In stable all-in-one admixtures with much lower final lipid concentrations commonly ranging from 20 to 50 g/l (2-5%), these volume-weighted values are similar, i.e. PFAT>5 µm are <0.1% for 24-30 h at room temperature (Driscoll, D. F., Bacon, M. N., Bistrian, B. R., 2000, J. Parenter. Enteral Nutr. 24, 15-22; Driscoll, D. F., et al., 2001, Clin. Nutr. 20, 151-157).

However, when the growth of fat globules in the large diameter tail progresses to a PFAT>5 µm of 0.4% or higher, the emulsions exhibit signs of phase separation and was originally suggested to be a 'threshold' concentration that defines the pharmaceutical instability of IVLEs (Driscoll, D. F., et al., 1995, Am. J. Health Sys. Pharm. 52, 623-634). Clearly, this definition focuses on a quantitatively small fraction of the total population of lipid droplets in the emulsion, as the vast majority of these are <1 µm (i.e. >99% of the total fat present). For example, at the proposed threshold of pharmaceutical instability (PFAT>5 µm=0.4%), only 0.08-0.2 g/l of free oil are in the large diameter tail of the globule size distribution based on typical final lipid concentrations in all-in-one admixtures. Although the amounts of free oil present are relatively small at this pre-selected threshold, it is a quantitatively significant population of enlarged fat globules, largely spanning a size range between 5 and 20 µm and containing $10^5$-$10^6$ globules/ml. If inadvertently administered by intravenous infusion, it might produce an embolic syndrome given the typical flow rates of TPN infusions.

Generally, all-in-one admixtures are given as 24-h continuous infusions, and in adults often range from 42 to 125 ml/h (1-3 l/day) or in pediatric patients from 2 to 20 ml/h (50-500 ml/day). Thus, the cumulative dose of enlarged fat globules (i.e. PFAT>5 µm) from unstable all-in-one admixtures is capable of saturating the perfused surface area of the pulmonary microvasculature. The precise toxic parenteral dose of coalesced fat globules >5 µm is not known, but such globules are likely to be most dangerous in either critically ill patients and/or those with pre-existing pulmonary disease (El-Ebiary et al., 1995, Crit. Care Med. 23, 1928-1930; Driscoll, D. F., 1997, Nutrition 12, 166-167 Editorial; Moore, F. A., 2001, Crit. Care Med. 29, 1644-1645 Editorial).

Clearly, large fat globules >5 µm are likely less toxic than similarly sized precipitates, such as dibasic calcium phosphate crystals, owing to the flexibility of the globules in the former example compared to the rigidity of the solid particles in the latter case. Nevertheless, because of the potentially adverse clinical consequences and insidious nature of unstable IVLEs, the principal focus of our investigations are on the extent of coalescence by changes in the large diameter tail (PFAT>5 µm) of the globule size distribution rather than on earlier stages of emulsion instability (i.e. aggregation).

The present inventors have previously demonstrated that IVLEs containing physical mixtures of MCTs and LCTs are more stable than pure LCTs in both high (Driscoll et al., 2000, J. Parenter. Enternal Nutr. 24, 15-22) and low osmolality (Driscoll, D. F., et al., 2001, Clin. Nutr. 20, 151-157) all-in-one admixtures. To further investigate the stabilizing influence of MCTs on emulsion stability, the present inventors have now studied these effects using a low osmolality all-in-one admixture with two types of MCT-LCT physical mixtures; one single emulsion formulation containing these oils versus two extemporaneously compounded formulations containing different ratios of MCT and LCT prepared from two separate starting emulsions. This was performed in order to investigate whether the method of emulsion preparation and/or the ratio of MCT to LCT affected the otherwise stabilizing influence of MCTs on all-in-one admixtures previously demonstrated. The present inventors have now demonstrated that the method of emulsion preparation is important in affecting the stabilizing influence of MCTs and have extended the beneficial effects for these mixtures intended for critically ill, premature and newborn infants.

It should be noted that previous studies involving parenteral nutrition (PN) admixtures have largely involved admixtures intended for adults. PN admixtures intended for very young patients (neonate to the first year of life) have a very different final composition compared to those prescribed for older children and adults. This is primarily the result of differences in the amino acid profiles and certain electrolyte concentrations conventionally used in each population. Contrasted with adults, the pediatric amino acid profiles have a higher content of branched-chain amino acids (i.e., leucine, isoleucine and valine) and contain taurine. In addition, the amino acid cysteine, which is found in very small quantities in some commercial adult products, is often added extemporaneously as the hydrochloride salt in pediatric formulations, and in specific proportions to the amounts of protein prescribed in order to achieve nitrogen balance (NATIONAL ADVISORY GROUP ON STANDARDS AND PRACTICE GUIDELINES FOR PARENTERAL NUTRITION (1998) JPEN 22: 49-66).

Consequently, the pediatric amino acid formulations are more acidic than those used in adults. Of all the additives that can comprise a PN admixture (i.e., amino acids, dextrose, lipids, electrolytes, vitamins and minerals), only commercial amino acid formulations contain a sufficient quantity of buffers that ultimately determines the final pH of the admixture. Thus, because of the composition differences between adult and pediatric amino acid formulations, the final pH of PN admixtures comprised for adults are characteristically between 5.8-6.4, whereas for very young children they are between 4.8-5.4. In addition, because the caloric requirements for newborns are 4-6 times higher per kilogram than adults, these admixtures often have very different macronutrient profiles that may also affect all-in-one (AIO) stability. Although the final proportions of carbohydrate and lipid calories are similar to adults, the amount of protein for a given level of energy intake in the very young is lower. For example, if adults are fed at 25 kcal/kg and receive 1.5 g/kg of protein, the typical calorie-nitrogen (C:N) ratios in adults are ~80-100:1, compared to infants fed at 120 kcal/kg and 3.0 g/kg of protein, with a corresponding C:N ratio of ~225-250:1. Finally, another important difference between adult and pediatric parenteral nutrition formulations is the daily amounts of certain essential electrolytes. For example, the parenteral equivalent of the recommended dietary allowance (RDA) for calcium in adults is in the range of 2.5-7.5 mmol/day, whereas for pediatric patients the range is between 10-15 mmol/day (NATIONAL ADVISORY GROUP, supra). Consequently, given the importance of amino acid (Washington C, et al. (1991) Int. J. Pharm. 77: 57-63) and electrolyte (Washington C. (1992) Int. J. Pharm. 87: 167-74) concentrations to AIO stability, these formulations have not been used in the neonatal and infant populations due to the major compositional differences (lower pH, low final amino acid concentration, high final calcium concentration) compared to adults.

Thus, the separate infusion of intravenous lipid emulsions (IVLEs) is common practice in the acute care of very young patients, yet is associated with significant morbidity and mortality (Freeman J, et al. (1990) N. Engl. J. Med. 323: 301-8; Avila-Figueroa C, et al. (1998) Pediatr. Infect. Dis. J. 17: 10-17; Matlow A G, et al. (1999) Infect. Contr. Hosp. Epidem. 20: 487-93).

The present inventors have previously demonstrated that IVLEs consisting of both medium-chain triglycerides (MCTs) and long-chain triglycerides (LCTs) have produced more stable AIOs in both high and low osmolality formulations in adults, where pure LCT-based AIOs have often failed (Driscoll D F, Bacon M N, Bistrian B R. (2000) JPEN 24: 15-22; Driscoll D F, et al. (2001) Clin. Nutr. 20: 151-57). As the present inventors now show, however, the stabilizing effect of MCTs on AIOs is dependent on the mode of preparing the formulations.

Moreover, the present inventors also now show that MCT-containing IVLEs can be used in AIOs for the very young, that is, for young patients weighing 1, 2.5 and 5 kg, to provide the macronutrient profile required for the very young and to minimize the risks of infection attendant to the separate administration of lipid emulsions.

Use of the present invention provides several benefits, including but not limited to the following:

Reduction in the risk of infections associated with the separate administration of lipid emulsions;

Improved metabolic utilization (e.g. oxidation) of the infused lipid emulsion over 24 hours versus shorted time intervals and therefore less adverse effects;

Providing more appropriate infusion rates and less n-6 LCT % s to thereby provide less stimulation of eicosanoid production and therefore and thus less potential for adverse effects;

Providing more stable lipid emulsions and reducing the risk of embolization associated with less stable lipid emulsions made from pure LCTs; and Improving the ability to meet the special nutritional needs of a pediatric patient by providing intravenous nutritional support.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1. (a) Admixture I: 50:40:10 MCT n-6 LCT n-3 LCT as an AIO at times 0, 6, 24 and 30 h; (b) Admixture II: 75:25 MCT-LCT and as an AIO at times 0, 6, 24 and 30 h; (c) Admixture III: 50:50 MCT-LCT and as an AIO at times 0, 6, 24 and 30 h.

FIG. 3 Admixture IV. Historical comparison of volume-weighted profile of: (a) a 100% soybean oil-based; (b) a 50:50 soybean oil-safflower-based all-in-one admixture of identical composition (Driscoll, D. F., et al. (2001) Clin. Nutr. 20: 151-157).

FIG. 4. Graphic depiction of Admixture II GSD profiles.

FIG. 5. A. Photomicrographs of SS-based all-in-one admixture using the highest ionic strength 2.5 kg formulation. B. Photomicrographs of MS-based all-in-one admixture using the highest ionic strength 2.5 kg formulation. C. Photomicrographs of MSF-based all-in-one admixture using the highest ionic strength 2.5 kg formulation.

DETAILED DESCRIPTION OF THE INVENTION

Figure 2:
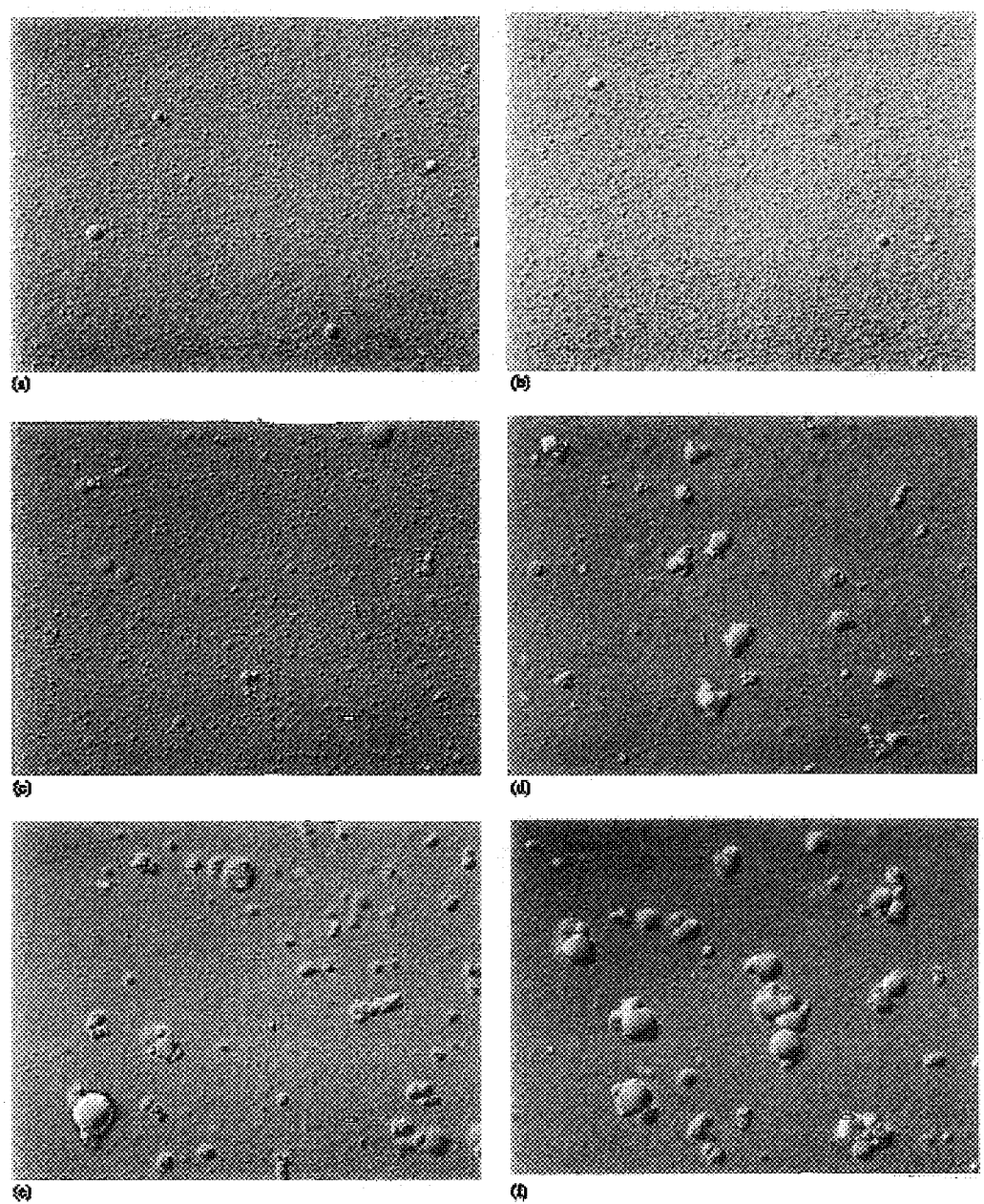
FIG. 2. Photomicrographs of: (a) Admixture I at time 0 h; (b) Admixture I at time 30 h; (c) Admixture II at time 0 h; (d) Admixture II at time 30 h; (e) Admixture III at time 0 h; (f) Admixture III at time 30 h.

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the preferred methods, devices and materials are now described.

All publications mentioned herein, and in the attached references, are incorporated herein by reference for the purpose of describing and disclosing, for example, compositions and methodologies that are described in the publications which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

The present invention is directed to materials and methods for preparing All-in-One ("AIO") formulations suitable for administration to infants and neonates for total parenteral nutrition. AIO (also known as "3-in-1" or "Total Nutrient Admixtures") refer to a complete nutritional formula containing the three base nutrients (amino acids, dextrose and lipids) plus other nutrients in a single container. Hence, the final formulation is an emulsion, compared to conventional parenteral admixtures devoid of lipids, which are solutions.

Lipids. The lipid emulsions used in the AIO formulations of the present invention include mixtures of medium-chain triglyceride oils (MCT) and long-chain triglyceride oils (LCT). The MCT and LCT oils are combined prior to emulsification.

Medium-chain triglycerides are those having chain lengths of fatty acid ranging from $C_6$ to $C_{14}$. In one embodiment, the MCT component of the AIO formulation is comprised of at least 90% by weight of triglycerides of caprylic acid ($C_8$) and capric acid ($C_{10}$). The fraction of medium-chain triglycerides, based on the total lipid content of the AIO formulation, is preferably from 45% to 80%, more preferably from 50% to 75%, by weight.

Long-chain triglycerides, having chain lengths of fatty acids greater than $C_{14}$, include both vegetable oils and/or fish oils. Preferably, the lipid component of the AIO formulation contains at least one vegetable oil, the content of such vegetable oils in the lipid emulsion preferably being from 20 to 80%, more preferably from 25 to 50%, by weight, based on the lipid content of the lipid emulsion. More preferably, the lipid component contains at least one vegetable oil containing triglycerides made predominantly of omega-6 fatty acids. Preferred vegetable oils are safflower oil and/or soybean oil.

In one embodiment of the present invention, the lipid component of the AIO may also further contains at least one fish oil. Fish oils are known to contain eicosapentaenoic acid (EPA, 20:5 n-3) and docosahexaenoic acid (DHA, 22:6 n-3) incorporated in triglycerides which, being so-called highly unsaturated omega-3 fatty acids, are essential building blocks which have to be supplied to the body and which are biologically important, for example, as precursors of eicosanoids and as structural elements of membrane lipids. These acids are further attributed antithrombotic and lipid-lowering actions. Since their isolation from natural products and their chemical synthesis is expensive, fish oils, being relatively inexpensive, are the suppliers of choice for such essential fatty acids. As used in the invention, the term "fish oils" is intended to comprise natural fish oils, processed fish oils, or highly purified fish oil concentrates. According to the invention, processed fish oils may also be used, such as described e.g. in EP-A-0 298 293 which is incorporated herein by reference.

Suitable exemplary fish oils are oils which are obtained from cold water fish on a technically significant scale or oils which are synthetically obtainable by esterification of omega-3-fatty acids (obtained from fish oil of cold water fish, preferably salmon, sardine, mackerel, herring, anchovy, smelt and swordfish, by hydrolysis of the triglycerides and subsequent purification and concentration of the resultant omega-3-fatty acids) with glycerol. Fish oils generally contain triglycerides of fatty acids having chain lengths of from 12 to 22 carbon atoms. Particularly preferred are highly purified fish oil concentrates which are obtained, for instance, from sardine, salmon, herring and/or mackerel oils. They have an eicosapentaenoic acid content of from 20 to 40%, preferably at least 25%, based on the fatty acid methyl esters of the fish oil concentrate as determined by gas chromatography (percent by area). Furthermore, they have a docosahexaenoic acid content of from 10 to 20%, preferably at least 12%, based on the fatty acid methyl esters of the fish oil concentrate as determined by gas chromatography (percent by area). In case of the fish oils which are synthetically obtainable by the re-esterification of the omega-3-fatty acids the total concentration of eicosapentaenoic+docosahexaenoic acid can be at least 45% on basis of the triglycerides.

It is particularly preferred to use a fish oil rich in EPA when inflammatory processes are to be influenced. Fish oil rich in DHA is particularly preferred in pediatric patients in the case of omega-3 fatty acid deficiency to influence growth and maturation of the central nervous system.

Preferably, the content of fish oil, based on the total lipid content of the lipid emulsion, is from 5 to 25%, more preferably from 10 to 20%, by weight.

Importantly, the MCT and LCT (from vegetable and/or fish) oils are combined prior to emulsification in distilled water, the total lipid content of the lipid emulsion ranging from 5% to 30%, preferably from 10% to 30%, by weight, based on the aqueous oil-in-water lipid emulsion.

In addition to distilled water, the lipid emulsion contains the usual auxiliary agents and/or additives, such as emulsifiers, emulsifying aids (co-emulsifiers), stabilizers. antioxidants, and isotonic-imparting additives.

As emulsifiers, physiologically acceptable emulsifiers are used, such as phospholipids of animal or vegetable origin. Particularly preferred are purified lecithins, especially soybean lecithin, egg lecithin, or fractions thereof, or the corresponding phosphatides. The emulsifier content is from 0.6% to 1.8%, preferably 1.2%, by weight, based on the total lipid emulsion.

Further, alkali metal salts of long-chain, $C_{16}$ to $C_{20}$, fatty acids may be used as emulsifying aids (co-emulsifiers). Especially preferred are their sodium salts. The co-emulsifiers are employed in concentrations of from 0.005% to 0.1%, preferably 0.02% to 0.04%, by weight, based on the total emulsion. Further, cholesterol or a cholesterol ester alone or in combination with other co-emulsifiers may be employed in a concentration of from 0.005% to 0.1%, preferably from 0.02% to 0.04%, by weight.

The lipid emulsion according to the invention may contain vitamin E, in particular α-tocopherol, and/or ascorbyl palmitate as antioxidants and thus for protection from peroxide formation in amounts of from 10 to 1000 mg, preferably 25 to 200 mg, based on 100 g of lipid.

For stabilization and isotonicity, the emulsion may contain from 2% to 5% by weight of a stabilizing or isotonic-imparting additive, for example, a polyhydric alcohol. In this connection, glycerol, sorbitol, xylitol or glucose are preferred, glycerol being particularly preferred.

In preparing the lipid emulsion for inclusion in the AIO formulation, it is important to first combine the lipids before adding distilled water or any other non-lipid component. Thus, for example, it is important to first combine the LCT and MCT oils, then to add the other components to form the lipid emulsion. Forming separate MCT and LCT emulsions and then combining the two emulsions in the final AIO formulation will lead to reduced stability of the final emulsion.

The lipid emulsions can be prepared by known procedures with inertization. The average droplet size of the emulsion may be reduced by additional homogenization, e.g. using a high-pressure homogenizer. For parenteral application, medium lipid droplet sizes of less than 1.0 µm, in particular less than 0.5 µm, are preferred.

Suitable lipid emulsions are described in U.S. Pat. No. 6,008,248, the entire contents of which are hereby incorporated by reference.

Lipids are provided in the AIO formulation in the range of about 1 g/100 mL to about 4 g/100 mL.

Amino acids. Amino acids provide the building blocks for protein in parenteral nutrition. Standard commercially produced mixtures of essential and non-essential amino acids are available. TROPHAMINE® (B. Braun; 6% and 10% Amino Acid Injections) is an amino acid formulation designed for term and premature infants up to age 3 months. TROPHAMINE® infusion or similar products such as AMINOSYN PF®, PREMASOL®, replicates the serum amino acid concentrations of a breast-fed infant and contains the essential amino acids isoleucine, leucine, valine, threonine, methionine, tryptophan, phenylalanine, and lysine, the semi-essential amino acids histidine, tyrosine, cysteine, and taurine, and the non-essential amino acids glycine, alanine, proline, serine, arginine, aspartate, and glutamine. Other amino acid formulations are commercially available or may be custom formulated according to the particular needs of the patient, as will be appreciated by the skilled practitioner.

Amino acids are provided in the neonatal AIO formulation in the range of about 1 g/100 mL to about 5.5 g/100 mL.

Glucose source. A source of glucose is provided as an energy source in the neonatal AIO formulation. Preferably, dextrose is provided in an amount of about 5 g/100 mL to about 20 g/100 mL.

Electrolytes. Optionally, electrolytes such as copper, chromium, iodine, manganese, molybdenum, selenium, zinc, sodium, calcium, potassium, magnesium, phosphate and chloride acetate (or mixtures thereof) may be included in the AIO formulation, typically in a range from about 0 mEq/100 mL to about 8 mEq/100 mL, as shown below in Table 1.

Other components. Other components of the neonate and/or infant AIO formulation may include Cysteine HCl, typically added in a range from about 10 mg/100 mL to about 200 mg/100 Ml or approximately 40 mg per gram of protein prescribed, pediatric multiple trace elements (from about 0.1 mL/100 mL to about 1 mL/100 mL), pediatric multivitamins (from about 1.0 mL/100 mL to about 10 mL/100 mL), and drugs, such as heparin (from about 50 units/100 mL to about 100 units/100 mL). Other additives may be custom formulated according to the particular needs of the patient, as will be appreciated by the skilled practitioner.

Feeding Conditions for Neonates and Infants Receiving All-in-One Formulations. As discussed above, AIO formulations comprise amino acids, a glucose source and lipids plus other nutrients for a complete nutritional formulation in a single container. Suitable ranges of nutrients in the AIO formulation intended for neonates and infants is shown in Table 1, below.

TABLE 1

AIO Formulations for Infants and Neonates

| Admixture Component | Range of Nutrients |
|---|---|
| Amino Acids | 1-6 g/100 mL |
| Dextrose | 5-20 g/100 mL |
| Lipids | 1-4 g/100 mL |
| Sodium | 0-6 mEq/100 mL |
| Potassium | 0-4 mEq/100 mL |
| Calcium | 0-4 mEq/100 mL |
| Magnesium | 0-1 mEq/100 mL |
| Phosphate | 0-2 mmol/100 mL |
| Chloride/Acetate | 0-8 mEq/100 mL |
| Cysteine HCl | 10-240 mg/100 mL |
| Pediatric Multiple Trace Elements | 0.1-1 mL/100 mL |
| Pediatric Multivitamins | 1.0-10 mL/100 mL |

EXAMPLES

Preparation of Lipid Emulsions. The present inventors have investigated the physical stability of various preparations of intravenous lipid emulsions as all-in-one admixtures. Each final lipid emulsion used to compound the all-in-one formulation was a 20% w/v mixture containing MCTs and LCTs as either a single emulsion containing both triglycerides, or an emulsion made extemporaneously from separate starting emulsions of pure MCT and LCT. The first emulsion was composed of a 50:50 (by weight) physical mixture of MCTs and LCTs, and consisted of 50% MCT: 40% n-6 LCT (soybean oil): 10% n-3 LCT (fish oil) that was available as a single 20% w/v lipid emulsion. The second and third emulsions were specially prepared from separate stock dispersions containing pure 20% w/v MCT and pure 20% w/v LCT (soybean oil) lipid emulsions, and were made in volume ratios of 75% MCT:25% n-6 LCT and 50% MCT:50% n-6 LCT, respectively. This was done in order to investigate whether the method of emulsion preparation and/or ratio of MCT to LCT influenced all-in-one admixture stability. Each all-in-one admixture was studied at four intervals over 30 h at room temperature conditions by light extinction (or obscuration) using a single-particle optical sensing (LE/SPOS) technique. The data, performed in duplicate at each interval, is expressed as the volume-weighted percent of fat (PFAT) globules >5 µm. The results confirm the stabilizing effects of MCTs when made as a physical oil mixture as a single lipid emulsion. However, stabilization is lost if the MCT and LCT emulsions are mixed from separate starting emulsions and then compounded as an all-in-one formulation. The extemporaneous mixing of commercial lipid emulsions is not recommended. Alternatively, emulsions were also studied when made as an all-in-one mixture from physical mixtures as single emulsions made from pure LCTs (50:50 mixture by weight of soybean and safflower oils) and compared to physical mixtures of MCTs and LCTs (50:40:10 mixtures by weight of 50% MCTs, 50% LCTs (40% as soybean oil and 10% as fish oil) for neonates and infants.

Example 1

Preparation of the Starting Emulsions Used in AIO Admixtures

Three different all-in-one admixtures were studied in duplicate. The final concentration of the lipid emulsion in the all-in-one admixtures was constant, but the ratios of MCTs to LCTs differed. The IVLE used in each all-in-one admixture differed in terms of the preparation of the starting emulsion. The low osmolality formulation used throughout appears in Table 2 and was made from sterile ingredients in a 3:1 volume ratio of Procalamine solution (3% amino acids and 3% glycerin injection with electrolytes; lot no. J9D028, McGaw Labs, Irvine, Calif., USA) to emulsion.

TABLE 2

Final Composition of the Emulsion Admixture Studied

| Component | Concentration (g/l) |
|---|---|
| Crystalline amino acids (eight essential and seven non essential) | 22.5 |
| Glycerin USP (glycerol) | 22.5 |
| Electrolytes: | |
| Sodium acetate: 3H$_2$O USP | 1.5 |
| Magnesium acetate-4H$_2$O | 0.41 |
| Calcium acetate-H$_2$O | 0.19 |
| Sodium chloride USP | 0.9 |
| Potassium chloride USP | 1.13 |
| Phosphoric acid NF | 0.3 |
| Potassium metabisulfite NF | <0.37 |
| Lipid emulsion: | 50 |
| (1) MCT oil    50% | 25 |
| Soybean oil   40% | 20 |
| Fish oil      10% | 5 |
| (2) MCT oil   75% | 37.5 |
| Soybean oil   25% | 12.5 |
| (3) MCT oil   50% | 25 |
| Soybean oil   50% | 25 |
| Egg phosphatides | 3 |
| Glycerin | 6.2 |
| Water for injection USP | Quantum satis |

The first starting emulsion was a 50:50 physical mixture of MCTs and LCTs and consisted of 50% MCT:40% n-6 LCT:10% n-3 LCT that was available as a single 20% w/v lipid emulsion (Lipoplus 20% lipid emulsion, lot no. 9235A32, B. Braun, Melsungen A G, Germany) and was used in Admixture I. The second and third starting emulsions were prepared in ratios of 75% MCT:25% n-6 LCT and 50% MCT:50% n-6 LCT, respectively, to simulate the concentrations of commercial lipid emulsion formulations. However, these were specially prepared from separate stock dispersions containing pure 20% w/v MCT (MCT 20% lipid emulsion, lot no. 0091a31a, B. Braun, Melsungen A G, Germany) and pure 20% w/v LCT (LCT 20% lipid emulsion, lot no. 0091b31b, B. Braun, Melsungen A G, Germany) lipid emulsions, and used in Admixtures II and III, respectively. Thus, the starting emulsions used in compounding the all-in-one admixtures differed in terms of being either a physical blend of oils in a single emulsion (Lipoplus 20%) or those extemporaneously compounded from two separate emulsions (MCT 20% and LCT 20%).

The physicochemical stability of the various emulsion preparations was assessed by light extinction using a single-particle optical sensing (LE/SPOS) instrument (5 AccuSizer 780/APS (version 1.59), Particle Sizing Systems, Santa Barbara, Calif., USA) to detect growth of submicron lipid droplets into enlarged fat globules over time. In addition, microscopic analyses were also performed to verify adverse changes in fat globule sizes detected by LE/SPOS, as well as by gross physical examination of the all-in-one admixtures for evidence of phase separation at each sample time interval. All starting emulsions were analyzed separately prior to compounding the all-in-one formulations. Each all-in-one admixture prepared for study was made in duplicate and studied at time 0 (immediately after preparation) and at times 6, 24 and 30 h later, at controlled room temperature conditions (22-26° C.). All formulations were aseptically prepared in a laminar airflow environment.

The individual profiles of the large-diameter tail of the globule size distribution for the starting emulsions and all-in-one admixtures at each time interval, expressed as the volume-weighted PFAT>5 µm, are shown in Table 3.

TABLE 3

Volume-Weighted Percent Fat (PFAT) >5 µm

| Time (h) | Admixture I[a] | Admixture II[b] | Admixture III[c] |
|---|---|---|---|
| MCT 20% | | 0.013 | 0.009 |
| LCT 20% | | 0.014 | 0.009 |
| Pre-admixture (emulsion mixture) | 0.009 | 0.016 | 0.009 |
| All in-one admixture | | | |
| 0 | 0.035 ± 0.008 | 0.034 ± 0.011 | 0.131 ± 0.019 |
| 6 | 0.026 ± 0.003 | 0.348 ± 0.041 | 1.033 ± 0.071 |
| 24 | 0.008 ± 0.003 | 0.794 ± 0.010 | 1.731 ± 0.144 |
| 30 | 0.003 ± 0.000 | 0.673 ± 0.041 | 1.529 ± 0.153 |

[a]50% MCT:40% n-6 LCT:10% n-3 LCT as a single emulsion
[b]75% MCT:25% n-6 LCT made from separate starting emulsions of 20% MCT and 20% n-6 LCT
[c]50% MCT:50% n-6 LCT made from separate starting emulsions of 20% MCT and 20% n-6 LCT The large diameter tail profiles for the final all-in-one admixtures over the 30 h study period are graphically depicted in FIGS. 1 A-C as a population analysis of these large fat globules. Table 3 depicts the changes in the number and concentration of lipid droplets constituting the large diameter tail and are particularly evident between the individual starting emulsions and the subsequent extemporaneously made emulsion mixtures of MCTs and LCTs immediately after compounding. This is especially true for Admixture III which exhibits rapid destabilization at time 0 (PFAT>5 µm=0.131), compared to the 'pre-admixture' emulsion value (PFAT>5 µm=0.009). Subsequently, both Admixtures II and III result in a pharmaceutically unstable all-in-one admixture with levels of PFAT>5 µm of 0.4% or higher at 24 and 6 h, respectively. Interestingly, the rate and extent of destabilization of Admixture II was substantially less than Admixture III, suggesting higher amounts of MCT produce less unstable all-in-one admixtures. In contrast, the 50:50 MCT-LCT single emulsion product as Admixture I maintained a stable PFAT>5 µm profile as an all-in-one admixture over the 30-h experimental period.

Finally, the findings from the LE/SPOS measurements are supported by microscopy. FIGS. 2A-F show the photomicrographs of each emulsion immediately after preparation as an all-in-one admixture, and 30-h later that corroborate the increases in coalesced fat globules in the large diameter tail of unstable all-in-one admixtures measured by the LE/SPOS technique.

As separate liquids of water and oil, the intermolecular binding forces present in each phase are equal in all directions within the bulk of the liquids; but as a homogenized mixture of lipid droplets dispersed in water, the forces between phases at the interface between liquids are variable and therefore unbalanced. The major competing intermolecular forces responsible at this interface include hydrogen bonding from the water phase and the Van der Waals attractive forces from the oil phase. The greater the difference in the dominant forces of the individual phases within the oil and water, respectively, the less miscible the two liquids are, and interfacial tension is high. An emulsifier is designed to adsorb at the oil droplet-water interface, thus overcoming the cohesive attractive forces present in the individual phases, which lowers the free energy and stabilizes the emulsion system. As the action of the egg yolk phosphatides emulsifier present in commercial IVLEs is to reduce interfacial tension between otherwise immiscible liquids, the physicochemical challenges to the potential energy barriers against coalescence are greatest when the oil phase is least miscible with the aqueous phase.

For example, the interfacial tension against water for an 18-carbon fatty acid such as oleic acid, that comprises approximately 25% of the LCT soybean oil is 15.6 dyn/cm, which is nearly double the value for an 8-carbon fatty acid such as caprylic acid, that comprises 70% of the MCT used clinically, which is 8.22 dyn/cm (Martin, A., 1993, in Physical Pharmacy, Williams and Wilkins, Baltimore, Md., USA). In other words, the longer the hydrocarbon chain length of the dispersed oil phase, the greater the interfacial tension against the continuous aqueous phase. Moreover, MCTs are approximately 100 times more water-soluble than LCTs. For example, at 20° C. the aqueous solubility of caprylic acid (C8:0) is 68 mg/ml compared to palmitic acid (C16:0) which is 0.72 mg/ml (Bach, A C and Babayan V K, 1982, Am. J. Clin. Nutr. 36, 950-962). Whether these differences have significance in terms of the physicochemical stability of phospholipid-stabilized IVLEs as all-in-one admixtures has been, until recently, largely unexplored.

Intuitively, it would appear for the same (relatively) emulsifier used in most commercial IVLEs, i.e. egg lecithin, that the stability of the emulsion would greatly vary with the composition of the oil phase. Not only may the differing interfacial tension values between oils be a stability factor, but the partitioning of the triglyceride from the oil phase to the emulsifier along the oil-water interface could also be affected. Such changes at the interface have been suggested to underlie the greater rates of hydrolysis seen with MCT-LCT single emulsions, compared with those made solely from LCT (Deckelbaum, R. J., et al., 1990, Biochemistry 29, 1136-1142; Sato, N. et al., 1994, J. Parenter. Enteral Nutr. 18, 112-1118; Hamburger, L. et al., 1998, FASEB J. 2988, a514). In support of this hypothesis, MCTs have been shown to displace LCT at the lipid droplet surfaces of MCT-LCT single emulsions by $^{13}C$ NMR spectroscopy (Hamilton J A, et al., 1996, J. Lipid Res. 37, 773-782).

Thus, the favorable interfacial location of MCT in MCT-LCT single emulsions, that allows the interaction with water soluble proteins such as lipases for more efficient in vivo hydrolysis, may also be operative between oils of varying hydrocarbon chain lengths in the dispersed phase with respect to the aqueous continuous phase that leads to a more stable lipid emulsion. These potential pharmaceutical-stabilizing effects might be manifested under conditions of physicochemical stress. Hence, we decided to investigate if the stabilizing effects of MCTs observed previously for both high and low osmolality all-in-one admixtures were also present when a very LCT oil, such as fish oil rich in the n-3 fatty acids, eicosapentaenoic acid (c:20:5n-3) and docosahexaenoic acid (c:22:6n-3) was added. In addition, we wanted to know if the way the starting emulsions were prepared prior to compounding would affect the stability. Finally, the extemporaneous mixing of commercial IVLEs is recommended for certain formulations; thus, the present study is relevant to the clinical setting (Omegaven Fresenius, September, 1998, Scientific booklet, Fresenius A G, Bad Hamburg, Germany).

The present inventors' current findings confirm previous work that showed the inclusion of MCT in a physical mixture with LCTs as a single emulsion yields stable all-in-one admixtures. The present study shows this to be true even when very long-chain triglycerides, such as fish oil, is present in the physical mixture. However, when MCTs and LCTs are manufactured as separate starting emulsions and then combined to form various ratios of the two, the stabilizing effects of MCTs with LCTs when used to compound an all-in-one admixture, are no longer present. This is presumably the result of pre-formed separate droplets of MCT or LCT in the individual emulsions that are protected by a coating of emulsifier which prevents displacement of LCT by MCT at the lipid droplet surface upon mixing.

However, such displacement in these extemporaneously prepared starting emulsions could randomly occur upon coalescence of two different droplets, but would do so at the expense of colloidal stability. In contrast, when the oils are blended together and homogenized as a single emulsion physical mixture, a favorable interfacial location for MCT is achieved, as the individual droplets consist of both MCTs and LCTs which is maintained in the final emulsion. We speculate the apparent decline in PFAT>5 μm seen in Table 3 for Admixture I is more likely an artifact related to the introduction of small amounts of air bubbles upon agitating the admixture prior to analysis in order to ensure a homogeneous sample. Such artifacts are not seen with Admixtures II and III as the contribution from such a small amount of air (volume weighted) is overwhelmed by a rapidly expanding globule size distribution from active coalescence. However, there is a decline in PFAT>5 μm between 24 and 30 h for both Admixtures II and III, and is also likely to be the result of oil adhering to the bag at these later stages of emulsion destabilization that affects the relative homogeneity of the sample.

As a final point of further comparison, FIGS. 3A and B depict the volume-weighted profiles over 30 h for all-in-one admixtures of identical nutrient composition used in this study, except they were composed of pure LCT-based emulsions (Driscoll, D. F., et al., 2001, Clin. Nutr. 20, 151-157). In particular, they show distinctly different peaks of instability (with respect to PFAT>5 μm) at 24 and 30 h compared to Admixtures II and III in the present study. Finally, even though the emulsion mixtures used to make Admixtures II and III were unstable according to our PFAT>5 μm criterion (>0.4%), the coarseness of the dispersion is substantially less than with all-in-one admixtures made from pure LCTs under the same conditions.

Thus, it can be inferred from the available data that pure LCT-based all-in-one admixtures degrade to a much greater extent than those containing MCTs and LCTs, and hence, are potentially more dangerous formulations in the clinical setting if they become unstable.

This further corroborates previous findings that single emulsion physical mixtures of MCTs and LCTs produce stable all-in-one admixtures. This is even true when very long-chain triglycerides are included and thus the interfacial behavior of the egg lecithin emulsifier is favorably affected by the 'surface-bound' MCTs in these mixed emulsions. However, the present inventors have shown that the stabilizing influence of MCTs on all-in-one admixtures is lost when physical mixtures of MCT and LCT are made extemporaneously from two separate starting emulsions. Thus, maximum all-in-one stability appears to be achieved when they are formulated from a physical blend of MCT and LCT oils as a single emulsion and therefore, the extemporaneous mixing of commercial IVLEs is not recommended.

Example 2

Preparation of Stable AIO Parenteral Formulations for Neonates and Infants

Brief Overview. Intravenous lipid emulsions (IVLEs) are unstable when growth of lipid droplets into large fat globules is detected by appropriate particle sizing techniques. Specifically, instability is evident when the volume-weighted percent fat (PFAT)>5 micrometers exceeds 0.4% of the total lipids present. This represents an approximate 10-fold increase in the population normally present in the large-diameter tail of stable lipid emulsions. The present inventors have now investigated the stability of various IVLEs containing physical mixtures of medium-(MCT) and/or long-chain triglycerides (LCT) in three different all-in-one (AIO) admixtures intended for neonatal and infant patients. Methods: The 20% (w/v) IVLEs used in this study were composed of the following oils (by weight): 1) 1:1—soybean/safflower (SS); 2) 1:1—MCT:soybean (MS); and 3) 5:4:1—MCT:soybean:fish (MSF). Stability was assessed by light obscuration or extinction to count large fat globules, and by aided (microscopic) and unaided (naked eye) visual assessments for up to 48 hours at room temperature. Results: The stability of SS-based admixtures significantly and rapidly deteriorated in one of the three AIO compositions studied, whereas the AIOs made from MS or MSF were stable for all formulations. Conclusion: The results show that AIOs made from MCT/LCT-containing IVLEs are more stable than those made from pure LCTs. As IVLEs in the neonatal and infant population are associated with significant infectious morbidity and mortality when given as a separate lipid infusion, administering them as a stable MCT/LCT-based AIO admixture should be a safer alternative.

Preparation of neonatal and infant parenteral nutrition admixtures. Each all-in-one admixture studied was composed of different levels of nutrient intake designed to invasively feed acutely ill children at various early weight stages of physical development (NATIONAL ADVISORY GROUP ON STANDARDS AND PRACTICE GUIDELINES FOR PARENTERAL NUTRITION (1998) JPEN 22: 49-66). We chose three different formulations representing a broad range of weights found in neonates and infants based on weights of 1 kg, 2.5 kg and 5 kg, as admixtures IV, V and VI, respectively. This weight range is also representative of birth weights at <$5^{th}$, the $5^{th}$, and >$95^{th}$ percentiles (Needleman R D. Chapter 10: The first year. In Behrman R E, Kliegman R M, Jenson H B (eds). Nelson Textbook of Pediatrics. 16th Ed., Philadelphia, Pa., USA: W B Saunders and Co., 2000; 32-39). The final composition of each AIO formulation studied is shown in Table 4 and they were derived from published recommendations (NATIONAL ADVISORY GROUP, supra). However, the original concentrations of calcium (15 mmol/L) and phosphate (20 mmol/L) intended for admixture V (2.5 kg formulation) had to be reduced to the amounts listed in Table 4 because of obvious precipitation problems from the outset.

TABLE 4

COMPOSITION OF THE THREE WEIGHT-SPECIFIC ALL-IN-ONE ADMIXTURES

| | CONCENTRATION PER LITER | | |
|---|---|---|---|
| COMPONENT | ADMIX-IV | ADMIX-V | ADMIX-VI |
| TrophAmine 10% (amino acids) | 20.0 g | 30.0 g | 22.5 g |
| Dextrose 70% | 180.0 g | 240.0 g | 214.0 g |
| Lipid Emulsion 20% (SS, MS, MSF) | 20.0 g | 30.0 g | 30.0 g |
| Sodium ($Na^+$) | 20.0 mmol | 50.0 mmol | 40.0 mmol |
| Potassium ($K^+$) | 13.3 mmol | 40.0 mmol | 30.0 mmol |
| Calcium ($Ca^{++}$) | 13.3 mmol | 10.0 mmol | 10.0 mmol |
| Magnesium ($Mg^{++}$) | 1.7 mmol | 2.5 mmol | 2.5 mmol |
| Phosphate ($PO_4^{-/--}$) | 6.7 mmol | 15.0 mmol | 10.0 mmol |
| Cysteine $HCl \cdot H_2O$ | 4.6 mmol | 6.9 mmol | 5.1 mmol |
| pH of all admixtures | 5.27 ± 0.12 | 5.33 ± 0.06 | 5.37 ± 0.06 |
| Prescribed Volume | 150.0 mL | 250.0 mL | 500.0 mL |
| Feeding Weight | 1.0 kg | 2.5 kg | 5.0 kg |

All formulations were aseptically prepared under a laminar airflow hood. The admixtures were hyperosmolar and therefore would require central venous access for safe administration, which is typical therapy in the acute care setting. All IVLEs used were various 50:50 physical mixtures of either pure LCTs (soybean:safflower, SS), or LCTs in combination with MCTs (MCT: soybean oil, MS; or MCT:soybean:fish oil, MSF) and are listed below:

Commercial Products

Liposyn II™ 20% lipid emulsion, Abbott Laboratories, Abbott Park, Ill., USA, Lot# 67-382-DE (50:50 soybean/safflower oil physical mixture)

Lipofundin MCT/LCT™ 20% lipid emulsion, B. Braun, Melsungen, Germany Lot# 0231A81 (50:50 medium-chain/long-chain triglyceride oil physical mixture)

Lipoplus™ 20% lipid emulsion, B. Braun, Melsungen, Germany Lot# 9235A32 (50:40:10 medium-chain/n-6 long-chain/n-3 fish oil physical mixture)

TrophAmine 10%, B. Braun, Irving, Cailf., USA Lot# JOB015

All-in-one stability analyses. The physicochemical stability of the various all-in-one admixtures was assessed by light extinction using a single-particle optical sensing (LE/SPOS) technique to quantify the volume-weighted percent of fat globules >5 μm over time and has been described previously (Driscoll D F, Bacon M N, Bistrian B R. (2000) JPEN 24: 15-22), and by aided (microscopy) or unaided (naked eye) visual analysis for evidence of phase separation. Each all-in-one formulation was made in triplicate for one of three weight categories, i.e., admixtures IV-VI, using three separate emulsion physical mixtures of varying oil composition (n=27), and studied for up to 48 hours after compounding at room temperature.

Data analyses. Parametric data generated from the light extinction assessments were analyzed by analysis of variance (ANOVA) to evaluate statistically significant differences in emulsion stability. Independent variables included emulsion type, weight-specific formulation, and time. The dependent variable of fat droplet size focused on the large-diameter tail of the GSD and included the volume-weighted PFAT>5 μm. Non-parametric data, such as categorical assessments, were evaluated by Chi-square analysis. The a priori level of statistical significance was set at 0.05 and a Systat Program (version 5.0, Systat Corporation, Evanston, Ill., USA) was used to assist in the statistical evaluations of the data.

Results. All of the MCT/LCT-based (MS and MSF) all-in-one admixtures were stable throughout the study, whereas certain pure LCT-based (SS) formulations showed significant deterioration as demonstrated by the overall ANOVA that was significant for emulsion type, weight-specific formulation and time (p<0.001). Of the three weight-specific AIOs studied (IV-VI) composed of SS-based emulsions, admixture V proved to be completely unstable. For these unstable formulations made from pure LCT-based admixtures, the AIOs failed by LE/SPOS (PFAT>5 μm=0.963±0.104) within six hours along with gross microscopic changes in the GSD, and were visibly "cracked" (i.e., separated with free oil present) by 24 hours. No further LE/SPOS data was taken after six hours from the SS-based AIO admixture V due to the significant and obvious level of deterioration seen in these admixtures at 24 hours. Table 5 shows the volume-weighted PFAT>5 μm in the large-diameter tail of the GSDs for all admixture groups.

TABLE 5

SIGNIFICANT[a] VOLUME WEIGHTED VALUES (PFAT >5 μM) OF ADMIXTURES[b] STUDIED OVER TIME

| Time | Emulsion | | |
|---|---|---|---|
| | SS | MS | MSF |
| Admixture IV | | | |
| 0-hr | 0.051 ± 0.010 | 0.027 ± 0.003 | 0.030 ± 0.013 |
| 6-hr | 0.033 ± 0.007 | 0.034 ± 0.018 | 0.018 ± 0.003 |
| 24-hr | 0.026 ± 0.005 | 0.021 ± 0.003 | 0.019 ± 0.005 |
| 30-hr | 0.021 ± 0.005 | 0.017 ± 0.004 | 0.026 ± 0.004 |
| 48-hr | 0.024 ± 0.009 | 0.018 ± 0.007 | 0.024 ± 0.002 |
| Admixture V | | | |
| 0-hr | 0.049 ± 0.005 | 0.023 ± 0.001 | 0.017 ± 0.001 |
| 6-hr | 0.963 ± 0.104 | 0.022 ± 0.006 | 0.016 ± 0.001 |
| 24-hr | FREE OIL | 0.016 ± 0.005 | 0.014 ± 0.003 |
| 30-hr | FREE OIL | 0.016 ± 0.005 | 0.011 ± 0.005 |
| 48-hr | FREE OIL | 0.017 ± 0.007 | 0.013 ± 0.003 |
| Admixture VI | | | |
| 0-hr | 0.035 ± 0.006 | 0.029 ± 0.003 | 0.027 ± 0.020 |
| 6-hr | 0.019 ± 0.006 | 0.024 ± 0.012 | 0.015 ± 0.002 |
| 24-hr | 0.015 ± 0.002 | 0.026 ± 0.009 | 0.011 ± 0.004 |
| 30-hr | 0.016 ± 0.002 | 0.017 ± 0.002 | 0.013 ± 0.003 |
| 48-hr | 0.025 ± 0.006 | 0.011 ± 0.003 | 0.010 ± 0.001 |

[a]p < 0.001 by overall ANOVA
[b]Triplicate admixtures for each type of emulsion studied.

FIG. 4 graphically illustrates the volume-weighted large diameter GSD profiles of Admixture V with different emulsions, and clearly shows the rapid and extensive degradation in the pure LCT-based (SS) AIO. FIG. 5 shows the corresponding microscopic depictions for these formulations. The unstable SS-based (FIG. 5A) AIO photomicrographs document the rapid rate of destabilization over 24 hours, whereas the stable MS (FIG. 5B) and MSF-based (FIG. 5C) AIOs are shown at Time 0 and at 48 hours. The microscopic pictures support the LE/SPOS-generated data.

Compared to the MCT/LCT-based formulations, the results from the majority of pure LCT-based admixtures showed significantly higher PFAT>5 μm values (i.e., large-diameter tail results) at most time points as shown in Table 6 (p<0.001). Although this is a statistically significant finding, only the extreme results given for SS-based admixture V (2.5 kg AIO) are likely to be of clinical significance. Nevertheless, the GSD data shows that AIOs containing MCTs (as MS or MSF) produce stable and less variable admixtures in all cases and there were no significant differences noted between the AIOs made from MS and MSF.

TABLE 6

PFAT >5 μm VALUES OVER TIME: STABLE VS. UNSTABLE AIOS

| OIL SOURCE | VALUES < SS* | VALUES ≧ SS | TOTALS |
|---|---|---|---|
| MS | 11 | 4 | 15 |
| MSF | 13 | 2 | 15 |
| TOTALS | 24 | 6 | 30 |

*MS and MSF values are significantly lower than SS-based AIOs.
Chi-Square Analysis: p < 0.001

The present inventors have shown that both high osmolality (i.e., intended for large vessels of the central venous circulation, such as the subclavian vein) and low osmolality (i.e., intended for small vessels of the peripheral venous circulation of the upper extremity) adult AIOs made from physical mixtures of medium-chain triglycerides (MCTs) and long-chain triglycerides (LCTs) are more stable than identical admixtures made from pure LCT emulsions (Driscoll D F, Bacon M N, Bistrian B R. (2000) JPEN 24: 15-22; Driscoll D F, et al. (2001) Clin. Nutr 2001; 20: 151-57). We decided to investigate if these differences in physicochemical stability were present between various physical mixtures of lipid emulsions in a variety of AIOs intended for administration to very young patients. Thus, we wanted to explore the possibility of using MCT/LCT formulations in the very young where a potential clinical benefit may exist compared to the present method of separate delivery of IVLEs, and to confirm the perceived limits of pure LCT-based AIOs in these mixtures of unique composition.

All commercially available IVLEs contain egg lecithin, an amphoteric emulsifier composed of a mixture of phosphatides such as phosphatidylcholine and phosphatidylethanolamine (primary constituents), as well as minor constituents like sphingomyelin. The emulsifier adsorbs to the surfaces of the individual lipid droplets whereby the nonpolar fatty acid tails bind to the oil droplet, and the polar phosphate groups extend outward into the continuous aqueous phase. At standard IVLE pH ranges between 6.0-9.0 (Intravenous Fat Emulsion (1998) Proposed Monograph, In-process revision, Pharmacopeial Forum 24: 6836-6841), where the polar phosphate groups in the aqueous phase of the emulsion are optimally ionized (Washington C (1990) Int. J. Pharm. 66: 1-21), inducing a net negative charge or zeta potential to the lipid droplet surfaces (i.e., between −30 to −50 millivolts) establishing electrostatic repulsion, colloidal stability is conferred.

All-in-one formulations are extemporaneously-prepared parenteral nutrition admixtures consisting of amino acids, dextrose, lipids, electrolytes, vitamins and minerals in varying concentrations. However, the inclusion of lipids into this mixture can promote instability of IVLEs by the addition of ionically active components. Disruption of this surface charge by the addition of cations neutralizes the anionic influence that exists between droplets to maintain electrostatic repulsion, thus allowing Van der Waals attractive forces to predominate, and causing aggregation of lipid droplets and colloidal instability. When given in sufficient quantities, ions of opposite charge will obliterate the previously stabilizing electrostatic charge imparted by the adsorbed emulsifier to the lipid droplet surfaces, which then can rapidly and irreversibly lead to coalescence and significant growth in the large-diameter tail of the globule size distribution (GSD). This basically occurs in two ways: 1) screening of the anionic atmosphere emanating from the lipid droplets by the presence of high concentrations of freely dissociated, non-adsorbing cations (e.g., $Na^+$, $K^+$) circulating in the aqueous phase, thus interfering with the negatively-charged atmosphere between droplets, consistent with the DLVO theory of colloid stability (Deryaguin B V. (1940) Tran. Farraday Soc. 36: 203-215; Verwey E J W, Overbeek J T G. (1948) Theory of stability of lyophobic colloids. Amsterdam: Elsevier, 1948); and/or 2) diffusion of certain cations (e.g., $H^+$, $C^{+2}$, $Mg^{+2}$) from the aqueous phase to the interface where they specifically adsorb to the negatively charged oil droplets (Washington C. (1990) Int. J. Pharm. 66: 1-21), neutralizing the anionic surface charge. Consequently, in either event, the deleterious effect of these ions is to overcome the electrostatic forces (i.e., zeta potential) responsible for stabilizing the emulsion that may lead to the separation of the oil and aqueous phases, and thereby increasing the danger of the infusion. Thus, for complete parenteral nutrition admixtures containing IVLEs, both mechanisms of colloidal instability (i.e., screening and adsorption) are operative in a given AIO formulation, and hence, the time course towards its destabilization is largely a function of the concentration of these electrolytes and their net effects on zeta potential. In practice, pharmacists routinely involved in compounding AIOs recognize the inevitability of these ionic interactions and subsequent adverse effects, and hence, assign beyond-use dates that ensure the formulation is stable during the period of infusion (Driscoll D F. (1995) Nutr. Clin. Prac. 10: 114-19). Otherwise, the intravenous infusion of substantial amounts of enlarged coalesced fat globules may be trapped in the capillaries of the lungs (Intravenous Fat Emulsion (1998) Proposed Monograph, In-process revision, Pharmacopeial Forum 24: 6836-6841) that could produce a potentially fatal embolic syndrome.

Until recently, the limits of IVLE stability have been poorly defined, however, significant improvements in droplet sizing methods, i.e., LE/SPOS, have enabled far more accurate depictions of the clinically important large-diameter tail of the globule size distribution (Driscoll D F, et al. (2001) Int. J. Pharm. 219: 21-37; Driscoll D F (2002) J. Disp. Sci. Tech. 23: 679-687). Stable intravenous lipid emulsions (IVLEs) are two-phase mixtures containing a nearly uniform distribution of finely homogenized oil droplets (approximate mean droplet size range: 0.25-0.45 μm) dispersed in sterile water for injection. Instability of IVLEs manifests to varying degrees by significant growth in the population of oversized fat globules found in the large-diameter tail of the dispersion (>5 μm). For example, stable commercial IVLEs have been shown to have a volume-weighted percent of fat (PFAT)>5 μm of up to 0.05% (Driscoll D F, et al. (2001) Int. J. Pharm. 219: 21-37), whereas IVLEs that have been modified for clinical use such as an AIO, exhibit instability and ultimately phase separation (liberation of free oil) when the PFAT>5 μm reaches a value of 0.4% or higher (Driscoll D F, et al. (1995) Am. J. Health-Syst. Pharm. 52: 623-34). Thus, there appears to be an approximate ten-fold difference between stable versus unstable IVLEs with respect to the volume-weighted fat globule population found in the large-diameter tail (>5 um) of the emulsion. In terms of numbers of large fat globules >5 μm, stable all-in-one admixtures typically contain between $10^3$-$10^4$ per mL, whereas in unstable formulations, they of course, also increase by approximately one order of magnitude or more (Driscoll D F. (2002) J. Disp. Sci. Tech. 23: 679-687). Considering the potential cumulative impact of 24-hour intravenous delivery of enlarged fat globules at typical all-in-one infusion rates ranging from 6-20 mL/hour in children, and 42-125 mLs/hour in adults, the continuous infusion of unstable IVLEs in acutely ill patients dramatically increases the risk of "plasma-derived fat embolism" (Holman G. (1995) J. Pathol. 176: 3-9), and its toxicity is likely accentuated in the face of co-existing pulmonary infection and/or disease.

Within 24 hours, the 2.5 kg formulation comprised of a pure LCT-based AIO from a 50:50 physical mixture of soybean and safflower oils (SS) exhibited rapid and nearly complete destabilization of the emulsion. Despite the early indications of instability detected by LE/SPOS (i.e., PFAT>5 μm=0.963±0.104) and the corresponding changes seen by light microscopy at six hours, unaided visual evidence of this disruption was not detected until 24 hours after its preparation. This fact points out the critical importance of the value of instrumental versus visual methods for determining the stability and the ultimate safety of IVLE infusions.

Compared to the 1 kg (admixture V) and 5 kg (admixture VI) AIO formulations, there were some noteworthy differences in the composition of 2.5 kg formulation (admixture V) that may be responsible for the unstable findings in the SS-based mixtures. Given the importance of the droplet charge or zeta potential in the stability of IVLEs, the effects of the multiple electrolytes in AIOs, their electrostatic interactions and activity coefficients, or ionic strength, may help explain some of the differences in stability observed in this study. The ionic strength or "μ" can be estimated from the following equation:

$$\mu = \tfrac{1}{2}\Sigma c_i z_i^2$$

where: ionic strength, μ, is equal to one-half the sum of the product of the concentration (moles/L) of ions, $c_i$, and the valences squared, $z_i^2$, of each (Martin A. Chapter 6. Solutions of electrolytes. In Martin A (ed). Physical Pharmacy. 4th Ed., Baltimore, Md., USA: Williams and Wilkins, 1993, 125-42). The calculations for each admixture studied are shown below:

| Ionic Strength Calculations of Admixtures Studied | | | |
|---|---|---|---|
| mmol/L | cation | anion | sub-total |
| Admixture IV | | | |
| NaCl 20.0: | $\mu = \tfrac{1}{2}(0.020 \times 1^2)$ | $+ (0.020 \times 1^2)$ | $= 0.0200$ |
| KCl 2.2: | $\mu = \tfrac{1}{2}(0.0022 \times 1^2)$ | $+ (0.0022 \times 1^2)$ | $= 0.0022$ |
| KPhos K = 11.1; P = 6.7: | | | |
| $KH_2PO_4$: | $\mu = \tfrac{1}{2}(0.0022 \times 1^2)$ | $+ (0.0022 \times 1^2)$ | $= 0.0022$ |
| $K_2HPO_4$: | $\mu = \tfrac{1}{2}(0.0089 \times 2 \times 1^2)$ | $+ (0.0045 \times 2^2)$ | $= 0.0179$ |
| $MgSO_4$ 1.7: | $\mu = \tfrac{1}{2}(0.0017 \times 2^2)$ | $+ (0.0017 \times 2^2)$ | $= 0.0068$ |
| $CaCl_2$ 13.3: | $\mu = \tfrac{1}{2}(0.0133 \times 2^2)$ | $+ (0.0133 \times 2 \times 1^2)$ | $= 0.0400$ |

-continued

Ionic Strength Calculations of Admixtures Studied

| mmol/L | cation | anion | sub-total |
|---|---|---|---|
| $\mu = \frac{1}{2} \Sigma\, c_i z_i^2 =$ | | | |
| $0.0200 + 0.0022 + 0.0022 + 0.0179 + 0.0068 + 0.0400$ | | $= 0.0891$ | |
| Admixture V | | | |
| NaCl 50.0: | $\mu = \frac{1}{2}(0.0500 \times 1^2)$ | $+ (00500 \times 1^2)$ | $= 0.0500$ |
| KCl 15.0: | $\mu = \frac{1}{2}(0.0150 \times 1^2)$ | $+ (0.0150 \times 1^2)$ | $= 0.0150$ |
| KPhos K = 25; P = 15: | | | |
| $KH_2PO_4$: | $\mu = \frac{1}{2}(0.0050 \times 1^2)$ | $+ (0.0050 \times 1^2)$ | $= 0.0050$ |
| $K_2HPO_4$: | $\mu = \frac{1}{2}(0.0200 \times 2 \times 1^2)$ | $+ (0.0100 \times 2^2)$ | $= 0.0400$ |
| $MgSO_4$ 2.5: | $\mu = \frac{1}{2}(0.0025 \times 2^2)$ | $+ (0.0025 \times 2^2)$ | $= 0.0100$ |
| $CaCl_2$ 10.0: | $\mu = \frac{1}{2}(0.0100 \times 2^2)$ | $+ (0.0100 \times 2 \times 1^2)$ | $= 0.0300$ |
| $\mu = \frac{1}{2} \Sigma\, c_i z_i^2 =$ | | | |
| $0.0500 + 0.0015 + 0.0050 + 0.0400 + 0.0100 + 0.0300$ | | $= 0.1365$ | |
| Admixture VI | | | |
| NaCl 40.0: | $\mu = \frac{1}{2}(0.0400 \times 1^2)$ | $+ (0.0400 \times 1^2)$ | $= 0.0400$ |
| KCl 13.3: | $\mu = \frac{1}{2}(0.0133 \times 1^2)$ | $+ (0.0133 \times 1^2)$ | $= 0.0133$ |
| KPhos K = 16.7; P = 10: | | | |
| $KH_2PO_4$: | $\mu = \frac{1}{2}(0.0033 \times 1^2)$ | $+ (0.0033 \times 1^2)$ | $= 0.0033$ |
| $K_2HPO_4$: | $\mu = \frac{1}{2}(0.0134 \times 2 \times 1^2)$ | $+ (0.0067 \times 2^2)$ | $= 0.0268$ |
| $MgSO_4$ 2.5: | $\mu = \frac{1}{2}(0.0025 \times 2^2)$ | $+ (0.0025 \times 2)$ | $= 0.0100$ |
| $CaCl_2$ 10.0: | $\mu = \frac{1}{2}(0.0100 \times 2^2)$ | $+ (0.0100 \times 2 \times 1^2)$ | $= 0.0300$ |
| $\mu = \frac{1}{2} \Sigma\, c_i z_i^2 =$ | | | |
| $0.0400 + 0.0133 + 0.0033 + 0.0268 + 0.0100 + 0.0300$ | | $= 0.1234$ | |

For example, the ionic strength (salt concentrations) of admixture IV (1 kg) was lowest of the three formulations studied, whereas admixtures V (2.5 kg) and VI (5 kg) were approximately 53 and 38% higher, respectively. Increasing ion concentrations, particularly positively-charged cations, leads to greater degrees of physicochemical stress, compared to lesser concentrations in AIO admixtures. Hence, based on ionic strength calculations, admixture V had the highest overall concentrations of disrupting electrolytes (adsorbing and non-adsorbing) and provides one possible reason why the pure LCT (SS) AIO proved to be unstable in this case. It should be emphasized that ionic strength calculations used here are relative, as they are based on the electrolytes added, and do not take into account the other ionic components in AIOs, such as the individual amino acids or other charged additives.

Although admixture IV had the lowest ionic strength, it had the highest concentration of divalent cations, which might be predicted to be most destabilizing for AIO formulations, according to the Schultze-Hardy rule (increased valence, increased coalescence or coagulation), and therefore expected to have become unstable despite its relatively low ionic strength. The fact that even the pure LCT-based (SS) AIOs were stable in admixture IV is interesting to consider. In addition to the non-adsorbing screening cations ($Na^+$, $K^+$), the role of cations that adsorb to the lipid droplet surfaces, particularly calcium, can uniquely affect the electrostatic charge and the subsequent stability of egg lecithin-stabilized emulsions. As the concentration of adsorbing calcium ions increase, the surface charge can go from an anionic (stable), to a neutral (unstable), and then on to a cationic (stable) atmosphere. This progressive change in the electrical or zeta potential of the droplet surface, whereby the negatively-charged exterior induced by the emulsifier is replaced by a positively-charged surface associated with adsorbing ions such as calcium, is called charge-reversal. When this occurs, electrostatic repulsion is re-established, and the emulsion is stabilized. Thus, the lower ionic strength of admixture IV ($[Ca^{+2}]=13.3$ mmol/L) may also be more stable as a consequence of charge-reversal. Furthermore, it should be noted that the amino acid concentration was also lowest in admixture I resulting in a higher free calcium concentrations to participate in the charge-reversal process. Ultimately, measurement of zeta-potential would answer these questions. However, Washington et al showed evidence of charge reversal of lipid droplets, and maintenance of stability at calcium concentrations approximating those found in the 1 kg formulation of this study (Washington C, Ferguson J A, Irwin S E. (1993) J. Pharm. Sci. 82: 808-12). In contrast, the instability seen with the high ionic strength admixture V ($[Ca^{+2}]=10$ mmol/L) is probably a result of insufficient calcium to induce this phenomenon. That is, adsorption of free calcium to the oil droplet surfaces is reduced because of the lower amounts in the admixture, and by complexation given the higher concentrations of amino acids in admixture V (2.5 kg AIO). Hence, instability may be accentuated as a result of charge-neutralization by both screening and limited ion adsorption processes, promoting agglomeration of droplets and eventually, globule coalescence. Moreover, despite the same calcium concentration in admixture VI (5 kg AIO) as V (2.5 kg AIO) made from SS, the stability of admixture VI was likely achieved because a critical final electrolyte concentration threshold was not reached. The 15% variation in the calculated ionic strength differences between admixtures V and VI would suggest a marginal chemical distinction exists between stable and unstable AIOs, as well as the complexity of the cumulative effects of adsorbing and screening ions in these processes.

It is important to point out that despite the clinically relevant and extreme electrolyte-induced stress conditions posed in this study, the MCT-containing mixed emulsions (MS and MSF) were able to withstand the physicochemical challenges for all formulations. This was particularly noteworthy for the 2.5 kg formulation, which lends further validation to the superior AIO stability profiles of MCT/LCTs compared to those made from pure LCTs. The MCT/LCT-based AIOs were more stable and less variable compared to those compounded with pure LCTs (SS) as noted in Table 6. Lastly, the trend for PFAT>5 μm values to decline over time in the stable AIOs has been observed previously, and is likely the result of small amounts of air bubbles (on a volume-weighted basis) introduced into the AIO upon mixing that slowly disappears (Driscoll D F, et al. (2002) Int. J. Pharm. 240: 1-10).

Finally, the use of IVLEs in very young patients is associated with a high incidence of nosocomial infection (Freeman J, et al. (1990) N. Engl. J. Med. 323: 301-8; Avila-Figueroa C, et al. (1998) Pediatr. Infect. Dis. J. 17:10-17; Matlow A G, et al. (1999) Infect. Contr. Hosp. Epidem. 20: 487-93; McKee K T, Melly M A, Greene H H. (1979) Am. J. Dis. Child. 133:649-50; Jarvis H R, et al. (1983) Pediatr. Infect. Dis. 2: 203-9). The current practice of transferring sterile lipid emulsion from its original container to individual syringes is likely an important contributing factor, as lipid emulsion is an excellent growth media for various pathogenic organisms (Melly M A, Meng, H C, Schaffner W. (1975) Arch. Surg. 110: 1479-81; Kim C H, Lewis D E, Kumar A. (1983) Am. J. Hosp. Pharm. 40: 2159-2161).

In contrast to adults, these extemporaneous transfers are routinely performed in the pediatric population, as the total amount of lipid emulsion administered on a daily basis is often a fraction of the volume present in the various sizes of commercial IVLE dosage forms. Thus, lipid emulsion is often infused via these syringes over several hours, and for up to 24 hours. Touch contamination by the individual preparing the syringes and/or those administering the infusion to the patient (Reiter P D (2002) Am. J. Health-Syst. Pharm. 59:1857-9), could lead to iatrogenic infection. The risk of serious infection (i.e., sepsis) increases with the length of the lipid infusion (or the age/beyond-use date assigned to the syringe). This fact has been amply demonstrated with drug emulsions that use IVLEs as a drug delivery vehicle (Bennett S N, et al. (1995) N. Engl. J. Med. 333: 147-54). Compared to lipid emulsions used for nutritional purposes, the risk of contamination induced by removing the emulsion from its original package to another infusion container such as a syringe, would be greatly increased and might explain the high incidence of nosocomial infections in acutely ill children (Sacks G S, Driscoll D F. (2002) Nutr. Clin. Prac. 17:284-290). In contrast, AIOs do not support the growth of many common microorganisms (Rowe C E, Fukuyama T T, Martinoff J T. (1987) Drug Intell. Clin. Pharm. 21: 633-38; Vasilakis A, Apelgren K N. (1988) JPEN 12:356-59; D'Angio R G, et al. (1992) Ann. Pharmacother. 26: 14-17; Didier M E, Fischer S, Maki D G. (1998) JPEN 22: 291-96), and thus can be given continuously over 24 hours that also optimizes its metabolic utilization (i.e., oxidation) (Abbott W C, Grakauskas A M, Bistrian B R. (1984) Arch. Surg. 119: 1367-71). Therefore, all-in-one admixtures may be clinically beneficial to the very young if stability can be demonstrated by providing it continuously at a rate that minimizes adverse clinical effects, and in a vehicle (i.e., AIO) that does not support the growth of most nosocomial pathogens.

The use of all-in-one mixtures in the very young may be uniquely beneficial, especially to high-risk neonates and infants in the critical care setting. It appears that MCT/LCT physical mixtures, by virtue of their superior physicochemical stability profile, may allow AIOs to be used in a population where they have been avoided due to the unique composition of these admixtures and concerns regarding AIO stability. This therapy may represent a significant clinical advance in the care of critically ill children by reducing or even eliminating the need for separate, specially-prepared syringes of lipid emulsion and its attendant risks.

While this invention has been described in detail with reference to a certain preferred embodiments, it should be appreciated that the present invention is not limited to those precise embodiments. Rather, in view of the present disclosure which describes the current best mode for practicing the invention, many modifications and variations would present themselves to those of skill in the art without departing from the scope and spirit of this invention. In particular, it is to be understood that this invention is not limited to the particular methodology, protocols, constructs, and reagents described as such may vary, as will be appreciated by one of skill in the art. The scope of the invention is, therefore, indicated by the following claims rather than by the foregoing description. All changes, modifications, and variations coming within the meaning and range of equivalency of the claims are to be considered within their scope.

We claim:

1. A parenteral all-in-one formulation designed for central venous administration to neonatal patients, comprising:
   a glucose source,
   a pediatric amino acid formulation,
   cysteine hydrochloride,
   calcium, and
   a lipid emulsion, wherein the lipid emulsion comprises long chain triglycerides (LCT) and medium chain triglycerides (MCT) and wherein the LCT and MCT are combined prior to being emulsified.

2. The formulation of claim 1, wherein the lipid emulsion comprises, by weight, about 50% MCT and about 50% LCT.

3. The formulation of claim 1, wherein the lipid emulsion comprises, by weight, about 50% MCT, about 40% n-6 LCT and about 10% n-3 LCT.

4. The formulation of claim 1, wherein the lipid emulsion comprises at least 50% MCT by weight.

5. The formulation of claim 1, wherein the lipid emulsion comprises 75% MCT and 25% LCT by weight.

6. The formulation of claim 1, wherein the glucose source is dextrose.

7. The formulation of claim 1, wherein the LCT are selected from the group consisting of soybean oil, safflower oil, fish oil and mixtures thereof.

8. The formulation of claim 1, wherein the pediatric amino acid formulation comprises mixtures of essential and non-essential amino acids replicating the amino acid composition of breast-fed infants.

9. The formulation of claim 1, wherein the pediatric amino acid formulation comprises taurine.

10. The formulation of claim 1, wherein the amino acids are present in an amount from about 1 g/100 mL to about 6 g/100 mL.

11. The formulation of claim 1, wherein the glucose source is present in an amount from about 5 g/100 mL to about 20 g/100 mL.

12. The formulation of claim 1, wherein the lipid is present in an amount from about 1 g/100 mL to about 4 g/100 mL.

13. The formulation of claim 1, further comprising electrolytes.

14. The formulation of claim 13, wherein the electrolytes are selected from the group consisting of copper, chromium, iodine, manganese, molybdenum, selenium, zinc, sodium, potassium, calcium, magnesium, phosphate, chloride, acetate, and mixtures thereof.

15. A method for providing nutrition to a neonatal patient comprising the step of administering to the patient by central venous administration a therapeutically effective amount of an all-in-one formulation comprising:
   a glucose source,
   a pediatric amino acid formulation,
   cysteine hydrochloride,
   calcium, and
   a lipid emulsion, wherein the lipid emulsion comprises long chain triglycerides (LCT) and medium chain triglycerides (MCT) and wherein the LCT and MCT are combined prior to being emulsified.

16. The method of claim 15, wherein the lipid emulsion comprises by weight 50% MCT and 50% LCT.

17. The method of claim 15, wherein the lipid emulsion comprises by weight 50% MCT, 40% n-6 LCT and 10% n-3 LCT.

18. The method of claim 15, wherein the lipid emulsion comprises by weight at least 50% MCT.

19. The method of claim 15, wherein the lipid emulsion comprises by weight 75% MCT and 25% LCT.

20. The method of claim 15, wherein the glucose source is dextrose.

21. The method of claim 15, wherein the LCT are selected from the group consisting of soybean oil, safflower oil, fish oil and mixtures thereof.

22. The method of claim 15, wherein the pediatric amino acid formulation comprises mixtures of essential and non-essential amino acids replicating the amino acid composition of breast-fed infants.

23. The method of claim 15, wherein the pediatric amino acid formulations of amino acids comprises taurine.

24. The method of claim 15, wherein the amino acids are present in an amount from about 1 g/100 mL to about 6 g/100 mL.

25. The method of claim 15, wherein the glucose source is present in an amount from about 5 g/100 mL to about 20 g/100 mL.

26. The method of claim 15, wherein the lipid is present in an amount from about 1 g/100 mL to about 4 g/100 mL.

27. The method of claim 15, wherein the formulation further comprises electrolytes.

28. The method of claim 27, wherein the electrolytes are selected from the group consisting of copper, chromium, iodine, manganese, molybdenum, selenium, zinc, sodium, potassium, calcium, magnesium, phosphate, chloride, acetate, and mixtures thereof.

29. A method for reducing the risk of infection associated with the separate administration of lipid emulsions to a pediatric patient, the method comprising the step of administering to the patient by central venous administration a therapeutically effective amount of an all-in-one formulation comprising:
   a glucose source,
   a pediatric amino acid formulation, amino acids, and cysteine hydrochloride, and
   a lipid emulsion, wherein the lipid emulsion comprises long chain triglycerides (LCT) and medium chain triglycerides (MCT) and wherein the LCT and MCT are combined prior to being emulsified, wherein the lipid is present in an amount from about 1 g/100 ml to about 4 g/100 ml.

30. A method for improving the metabolic utilization of an infused lipid emulsion over a 24 hour period in a pediatric patient, the method comprising the step of administering to the patient by central venous administration uninterrupted over about a 24 hour period a therapeutically effective amount of an all-in-one formulation comprising:
   a glucose source, wherein the glucose source is present in an amount from about 5 g/100 ml to about 20 g/100 ml,
   a pediatric amino acid formulation amino acids, and calcium, and
   a lipid emulsion, wherein the lipid emulsion comprises long chain triglycerides (LCT) and medium chain triglycerides (MCT) and wherein the LCT and MCT are combined prior to being emulsified.

31. A method for reducing the risk of embolization associated with the administration of a pure LCT lipid emulsion to a pediatric patient, the method comprising the step of administering to the patient by central venous administration a therapeutically effective amount of an all-in-one formulation comprising:
   a glucose source,
   a pediatric amino acid formulation, wherein the amino acid formulation comprises taurine amino acids, and
   a lipid emulsion, wherein the lipid emulsion comprises long chain triglycerides (LCT) and medium chain triglycerides (MCT) and wherein the LCT and MCT are combined prior to being emulsified; wherein the lipid is present in an amount from about 1 g/100 ml to about 4 g/100 ml; and
   wherein a pH level of said all-in-one formulation is acidic.

32. The method of claim 31, wherein the pediatric amino acid formulation comprises mixtures of essential and non-essential amino acids replicating the amino acid composition of breast-fed infants.

33. The formulation of claim 1, wherein the cysteine hydrochloride is present in an amount up to about 40 mg per gram of pediatric amino acids.

34. The formulation of claim 1, wherein the calcium is present in an amount up to about 30 mEq.

35. The formulation of claim 1, wherein the calcium is present in an amount up to about 15 mmol/L.

36. The formulation of claim 15, wherein the cysteine hydrochloride is present in an amount up to about 40 mg per gram of pediatric amino acids.

37. The formulation of claim 15, wherein the calcium is present in an amount up to about 30 mEq.

38. The formulation of claim 15, wherein the calcium is present in an amount up to about 15 mmol/L.

* * * * *